United States Patent
Kim

(10) Patent No.: US 11,722,759 B2
(45) Date of Patent: Aug. 8, 2023

(54) ACTUATOR ASSEMBLY FOR A CAMERA MODULE

(71) Applicant: Ticona LLC, Florence, KY (US)

(72) Inventor: Young Shin Kim, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 217 days.

(21) Appl. No.: 16/813,808

(22) Filed: Mar. 10, 2020

(65) Prior Publication Data
US 2020/0304694 A1 Sep. 24, 2020

Related U.S. Application Data

(60) Provisional application No. 62/978,846, filed on Feb. 20, 2020, provisional application No. 62/885,333, (Continued)

(51) Int. Cl.
*H04N 23/55* (2023.01)
*G02B 7/08* (2021.01)
(Continued)

(52) U.S. Cl.
CPC .............. *H04N 23/55* (2023.01); *G02B 7/021* (2013.01); *G02B 7/08* (2013.01); *H04N 23/57* (2023.01)

(58) Field of Classification Search
CPC .. H04N 5/2254; H04N 5/2257; H04N 5/2253; H04N 23/55; H04N 23/57;
(Continued)

(56) References Cited

U.S. PATENT DOCUMENTS 5,362,809 A * 11/1994 Hallden-Abberton ...................... C08L 33/24
525/132
5,492,946 A 2/1996 Huspeni et al.
(Continued)

FOREIGN PATENT DOCUMENTS

CN 101497795 B 2/2013
CN 102352259 B 10/2013
(Continued)

OTHER PUBLICATIONS

Certificate of Analysis of CR10-20 and SP60-05 from Nippon Steel Chemical & Material Co., Ltd. (Micron Div.), Aug. 19, 2019, 1 page.
(Continued)

*Primary Examiner* — Chiawei Chen
(74) *Attorney, Agent, or Firm* — Dority & Manning, P.A.

(57) ABSTRACT

A camera module that includes a housing within a lens module is positioned that contains one or more lenses and an actuator assembly that is configured to drive the lens module in an optical axis direction is provided. The actuator assembly includes a guide unit that is positioned between the housing and the lens module. The guide unit comprises a polymer composition that includes a polymer matrix containing an aromatic polymer, wherein the polymer composition exhibits a flexural modulus of about 7,000 MPa or more as determined in accordance with ISO Test No. 178: 2010 at 23° C. and a Rockwell surface hardness of about 25 or more as determined in accordance with ASTM D785-08 (Scale M).

41 Claims, 2 Drawing Sheets

Related U.S. Application Data filed on Aug. 12, 2019, provisional application No. 62/821,077, filed on Mar. 20, 2019.

(51) Int. Cl.
  *G02B 7/02* (2021.01)
  *H04N 23/57* (2023.01)

(58) Field of Classification Search
  CPC .......... H04N 23/54; G02B 7/021; G02B 7/08; G03B 5/04; G03B 17/12; G03B 2205/0007; G03B 2205/0084; C08K 3/013; C08K 3/34; C08K 7/04; C08K 2201/017; C08L 33/00; C08L 63/00; C08L 67/02
  See application file for complete search history.

(56) References Cited

U.S. PATENT DOCUMENTS

| | | |
|---|---|---|
| 5,538,666 A | 7/1996 | Jin |
| 5,845,028 A | 12/1998 | Smith et al. |
| 5,891,132 A | 4/1999 | Hohla |
| 5,928,589 A | 7/1999 | Norota et al. |
| 6,046,300 A | 4/2000 | Umetsu et al. |
| 6,063,848 A | 5/2000 | Murakami et al. |
| 6,153,121 A | 11/2000 | Makabe et al. |
| 6,221,962 B1 | 4/2001 | Heino et al. |
| 6,306,946 B1 | 10/2001 | Long et al. |
| 6,461,732 B1 | 10/2002 | Wittmann et al. |
| 6,495,616 B2 | 12/2002 | Maeda |
| 6,680,002 B2 | 1/2004 | Yamauchi et al. |
| 6,730,378 B2 | 5/2004 | Matsuoka et al. |
| 6,733,691 B2 | 5/2004 | Nagano et al. |
| 7,113,351 B2 * | 9/2006 | Hovanky ............... G02B 7/102 359/814 |
| 7,166,238 B2 | 1/2007 | Kato et al. |
| 7,189,778 B2 | 3/2007 | Tobita et al. |
| 7,601,771 B2 | 10/2009 | Schmidt et al. |
| 7,608,666 B2 | 10/2009 | Matsuoka et al. |
| 7,612,130 B2 | 11/2009 | Kim |
| 7,740,770 B2 | 6/2010 | Mizumoto et al. |
| 7,776,410 B2 | 8/2010 | Nakane et al. |
| 7,862,745 B2 | 1/2011 | Tano et al. |
| 7,892,450 B2 | 2/2011 | Uchida et al. |
| 7,960,473 B2 | 6/2011 | Kobayashi et al. |
| 7,985,351 B2 | 7/2011 | Yamauchi et al. |
| 8,066,907 B2 | 11/2011 | Kohinata et al. |
| 8,086,099 B2 | 12/2011 | Schworm et al. |
| 8,142,683 B2 | 3/2012 | Murouchi et al. |
| 8,192,645 B2 | 6/2012 | Murouchi et al. |
| 8,202,448 B2 | 6/2012 | Fukuhara et al. |
| 8,262,933 B2 | 9/2012 | Sekimura et al. |
| 8,279,541 B2 | 10/2012 | Henderson et al. |
| 8,324,307 B2 | 12/2012 | Harder et al. |
| 8,432,484 B2 | 4/2013 | Christison |
| 8,465,670 B2 | 6/2013 | Kondo et al. |
| 8,545,719 B2 | 10/2013 | Komatsu et al. |
| 8,641,924 B2 | 2/2014 | Sekimura et al. |
| 8,646,994 B2 | 2/2014 | Kim et al. |
| 8,658,057 B2 | 2/2014 | Nakayama et al. |
| 8,696,932 B2 | 4/2014 | Uchida et al. |
| 8,778,220 B2 | 7/2014 | Lee et al. |
| 8,778,222 B2 | 7/2014 | Matsubara et al. |
| 8,784,683 B2 | 7/2014 | Matsubara et al. |
| 8,834,741 B2 | 9/2014 | Shiraishi et al. |
| 8,906,259 B2 | 12/2014 | Kim |
| 8,926,862 B2 | 1/2015 | Kim et al. |
| 8,932,483 B2 | 1/2015 | Kim |
| 9,013,588 B2 | 4/2015 | Moriya et al. |
| 9,085,672 B2 | 7/2015 | Matsubara et al. |
| 9,109,111 B2 | 8/2015 | Lee et al. |
| 9,228,080 B2 | 1/2016 | Arpin |
| 9,284,435 B2 | 3/2016 | Kim |
| 9,355,753 B2 | 5/2016 | Kim |
| 9,512,293 B2 | 12/2016 | Kim |
| 9,641,732 B2 * | 5/2017 | Yasukochi ............. G02B 7/021 |
| 9,667,845 B2 * | 5/2017 | Mirlay .................. G03B 35/10 |
| 9,822,254 B2 | 11/2017 | Kim |
| 9,862,809 B2 | 1/2018 | Kim et al. |
| 9,896,566 B2 * | 2/2018 | Yung .................... C08G 63/605 |
| 9,947,433 B2 | 4/2018 | Fujino et al. |
| 9,988,519 B2 | 6/2018 | Kim |
| 9,994,771 B2 | 6/2018 | Hegi |
| 9,995,904 B2 | 6/2018 | Lee et al. |
| 9,995,964 B2 | 6/2018 | Zhang et al. |
| 10,106,682 B2 | 10/2018 | Kim |
| 10,280,282 B2 | 5/2019 | Kim |
| 10,287,421 B2 | 5/2019 | Kim |
| 10,377,851 B2 | 8/2019 | Ishizu et al. |
| 10,407,605 B2 | 9/2019 | Kim et al. |
| 10,633,538 B2 | 4/2020 | Stoppelmann |
| 10,640,648 B2 | 5/2020 | Kim |
| 10,654,970 B2 | 5/2020 | Matsubara et al. |
| 10,767,049 B2 | 9/2020 | Kim |
| 10,822,452 B2 | 11/2020 | Tsuchiya et al. |
| 10,829,634 B2 | 11/2020 | Kim |
| 10,941,275 B2 | 3/2021 | Kim |
| 10,995,272 B2 | 5/2021 | Hara et al. |
| 2002/0064701 A1 | 5/2002 | Hand et al. |
| 2002/0172786 A1 | 11/2002 | Matsuoka et al. |
| 2003/0096070 A1 | 5/2003 | Matsuoka et al. |
| 2005/0077498 A1 | 4/2005 | Kato et al. |
| 2005/0176835 A1 | 8/2005 | Kobayashi et al. |
| 2005/0260361 A1 | 11/2005 | Alms et al. |
| 2006/0009580 A1 | 1/2006 | Alms et al. |
| 2006/0014876 A1 | 1/2006 | Bushelman et al. |
| 2007/0057236 A1 | 3/2007 | Hosoda et al. |
| 2007/0182059 A1 | 8/2007 | Ikegawa et al. |
| 2007/0190346 A1 | 8/2007 | Ikegawa |
| 2008/0048150 A1 | 2/2008 | Hosoda et al. |
| 2009/0268319 A1 * | 10/2009 | Woo ...................... G02B 7/102 359/824 |
| 2010/0061684 A1 * | 3/2010 | Terada ................... G02B 6/43 385/88 |
| 2011/0063741 A1 * | 3/2011 | Park ...................... G02B 7/102 359/823 |
| 2011/0189454 A1 | 8/2011 | Fukuhara et al. |
| 2011/0189455 A1 | 8/2011 | Fukuhara et al. |
| 2012/0199790 A1 | 8/2012 | Yun et al. |
| 2012/0218649 A1 * | 8/2012 | Konishi ................. G02B 7/021 156/305 |
| 2012/0232188 A1 | 9/2012 | Nakayama |
| 2012/0251769 A1 | 10/2012 | Harada et al. |
| 2012/0252955 A1 | 10/2012 | Sekimura et al. |
| 2013/0184376 A1 * | 7/2013 | Baidak .................. C08G 59/38 523/400 |
| 2014/0264183 A1 | 9/2014 | Kim |
| 2014/0272226 A1 * | 9/2014 | Kim ..................... B29C 48/2886 428/220 |
| 2014/0272365 A1 * | 9/2014 | Kim ....................... C09K 19/54 428/339 |
| 2014/0316041 A1 | 10/2014 | Mehta |
| 2015/0038631 A1 | 2/2015 | Hamaguchi et al. |
| 2015/0175803 A1 * | 6/2015 | Stoppelmann .......... C08L 77/02 428/35.7 |
| 2015/0291776 A1 * | 10/2015 | Kim ...................... C08K 5/3445 524/168 |
| 2016/0185940 A1 * | 6/2016 | Kim ........................ C08K 7/10 359/507 |
| 2018/0346641 A1 | 12/2018 | Hegi |
| 2018/0346642 A1 | 12/2018 | Hegi |
| 2019/0256703 A1 | 8/2019 | Kim |
| 2020/0041756 A1 * | 2/2020 | Kao ........................ G02B 7/08 |
| 2020/0165444 A1 | 5/2020 | Tachikawa |
| 2020/0247996 A1 | 8/2020 | Kim |
| 2020/0301255 A1 | 9/2020 | Kim |
| 2020/0347303 A1 | 11/2020 | Pan et al. |
| 2020/0362099 A1 | 11/2020 | Hara et al. |
| 2020/0399465 A1 | 12/2020 | Hara |

(56) References Cited

U.S. PATENT DOCUMENTS

| | | |
|---|---|---|
| 2020/0399470 A1 | 12/2020 | Kim |
| 2021/0061994 A1 | 3/2021 | Kim |

FOREIGN PATENT DOCUMENTS

| | | |
|---|---|---|
| CN | 104341721 A | 2/2015 |
| CN | 204332960 U | 5/2015 |
| CN | 103360729 B | 5/2016 |
| CN | 106674938 A | 5/2017 |
| CN | 106380790 B | 1/2018 |
| CN | 105764988 B | 6/2018 |
| CN | 105907058 B | 6/2018 |
| CN | 105980479 B | 10/2018 |
| CN | 109634002 A | 4/2019 |
| CN | 111073224 A | 4/2020 |
| CN | 111087765 A | 5/2020 |
| CN | 111117170 A | 5/2020 |
| CN | 111138815 A | 5/2020 |
| EP | 2 774 952 B1 | 6/2019 |
| JP | 2000080289 A | 3/2000 |
| JP | 3111471 B2 | 11/2000 |
| JP | 2001026699 A | 1/2001 |
| JP | 2006117731 A | 5/2006 |
| JP | 200713 8143 A | 6/2007 |
| JP | 2007254716 A | 10/2007 |
| JP | 2007254717 A | 10/2007 |
| JP | 2009191088 A | 8/2009 |
| JP | 4600015 B2 | 12/2010 |
| JP | 4600016 B2 | 12/2010 |
| JP | 4625304 B2 | 2/2011 |
| JP | 4657565 B2 | 3/2011 |
| JP | 2011137064 A | 7/2011 |
| JP | 2012021147 A | 2/2012 |
| JP | 5124932 B2 | 1/2013 |
| JP | 5132890 B2 | 1/2013 |
| JP | 5136324 B2 | 2/2013 |
| JP | 5256716 B2 | 8/2013 |
| JP | 5262138 B2 | 8/2013 |
| JP | 2013166848 A | 8/2013 |
| JP | 5396810 B2 | 1/2014 |
| JP | 5541330 B2 | 7/2014 |
| JP | 5742567 B2 | 7/2015 |
| JP | 2016124947 A | 7/2016 |
| JP | WO 2017/038421 A1 | 3/2017 |
| JP | 2017082158 A | 5/2017 |
| JP | WO 2017/110424 A1 | 6/2017 |
| JP | WO 2017/110646 A1 | 6/2017 |
| JP | 6164945 B2 | 7/2017 |
| JP | 6174406 B2 | 8/2017 |
| JP | 6190089 B1 | 8/2017 |
| JP | 2018012789 A | 1/2018 |
| JP | 6294690 B2 | 3/2018 |
| JP | 2018044108 A | 3/2018 |
| JP | WO 2018/066416 A1 | 4/2018 |
| JP | WO 2018/066417 A1 | 4/2018 |
| JP | WO 2018/074155 A1 | 4/2018 |
| JP | WO 2018/074156 A1 | 4/2018 |
| JP | 2018095683 A | 6/2018 |
| JP | 2018095684 A | 6/2018 |
| JP | 6359835 B2 | 7/2018 |
| JP | 2018106005 A | 7/2018 |
| JP | 6400690 B2 | 10/2018 |
| JP | 2018168207 A | 11/2018 |
| JP | 2019045607 A | 3/2019 |
| JP | WO 2019/054187 A1 | 3/2019 |
| JP | 6503272 B2 | 4/2019 |
| JP | 2019065263 A | 4/2019 |
| JP | WO 2019/065063 A1 | 4/2019 |
| JP | 6581659 B2 | 9/2019 |
| JP | WO 2019/203157 A1 | 10/2019 |
| JP | 2020029496 A | 2/2020 |
| JP | 2020029497 A | 2/2020 |
| JP | 2020164738 A | 10/2020 |
| JP | 6843675 B2 | 3/2021 |
| JP | 6844968 B2 | 3/2021 |
| JP | 2021038332 A | 3/2021 |
| JP | 2021059670 A | 4/2021 |
| JP | 6885687 B2 | 6/2021 |
| JP | 6892975 B1 | 6/2021 |
| JP | 2021098348 A | 7/2021 |
| KR | 20120059382 A | 6/2012 |
| KR | 0120136434 A | 12/2012 |
| KR | 20150011768 A | 2/2015 |
| KR | 101783505 B1 | 9/2017 |
| KR | 20200132709 A | 11/2020 |
| WO | WO 95/15360 A1 | 6/1995 |
| WO | WO 2013/129338 A1 | 9/2013 |
| WO | WO 2014/087842 A1 | 6/2014 |
| WO | WO 2015/083759 A1 | 6/2015 |
| WO | WO 2016/088714 A1 | 6/2016 |
| WO | WO 2017/110866 A1 | 6/2017 |
| WO | WO 2017/110867 A1 | 6/2017 |
| WO | WO 2018/012371 A1 | 1/2018 |
| WO | WO 2020/071495 A1 | 4/2020 |

OTHER PUBLICATIONS

Product Information for Kitamura PTFE Micropowder for Tribiology from Drextek, Inc., 2 pages.
Technical Data Sheet for XYDAR® CM-721 B from Solvay Specialty Polymers USA, LLC, 1 page.
Product Information on Lotader® AX8840 from Arkema Functional Polyolefins, 2 pages.
Material Safety Data Sheet for Lotader® AX8840, Jul. 11, 2011, 8 pages.
Product Information—SPH507M from Nippon Steel Chemical & Material Co., Ltd., Micron Div., Jul. 20, 2020, 1 page.
Safety Data Sheet from Nippon Steel Chemical & Material Co., Ltd, Micron Div. for SPH507 (amogphous silica), Aug. 3, 2020, 7 pages.
International Search Report and Written Opinion for PCT/US2020/021833 dated May 11, 2020, 11 pages.

* cited by examiner

ACTUATOR ASSEMBLY FOR A CAMERA MODULE

CROSS REFERENCE TO RELATED APPLICATIONS

The present application claims filing benefit of U.S. Provisional Patent Application Ser. No. 62/821,077 having a filing date of Mar. 20, 2019; U.S. Provisional Patent Application Ser. No. 62/885,333 having a filing date of Aug. 12, 2019; and U.S. Provisional Application Ser. No. 62/978,846 having a filing date of Feb. 20, 2020, which are incorporated herein by reference in their entirety.

BACKGROUND OF THE INVENTION

Camera modules (or components) are often employed in mobile phones, laptop computers, digital cameras, digital video cameras, etc. Generally, the camera module includes a lens module and an image sensor for converting an image of an object into an electrical signal. The lens module may be disposed in a housing and include a lens barrel having one or more lenses disposed therein. In addition, the camera module may include an actuator assembly for optical image stabilization (OIS) to reduce resolution loss, or blurring, caused by hand-shake. The actuator assembly functions by moving the lens module to a target position after receiving a certain signal. To help ensure proper alignment of the lens module during movement, many actuator assemblies also include ball bearings that help guide the lens module in the desired direction. Conventionally, these ball bearings are formed from a ceramic material that is sufficiently strong to withstanding the forces exerted during use. While strong, the ball bearings can nevertheless cause "dents" to form on surfaces of the camera module, which create noise and impact performance.

As such, a need exists for an actuator assembly that can exhibit better performance when employed in a camera module.

SUMMARY OF THE INVENTION

In accordance with one embodiment of the present invention, a camera module is disclosed that includes a housing within which a lens module is positioned that contains one or more lenses and an actuator assembly that is configured to drive the lens module in an optical axis direction. The actuator assembly includes a guide unit that is positioned between the housing and the lens module. The guide unit comprises a polymer composition that includes a polymer matrix containing an aromatic polymer, wherein the polymer composition exhibits a flexural modulus of about 7,000 MPa or more as determined in accordance with ISO Test No. 178:2010 at 23° C. and a Rockwell surface hardness of about 25 or more as determined in accordance with ASTM D785-08 (Scale M).

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
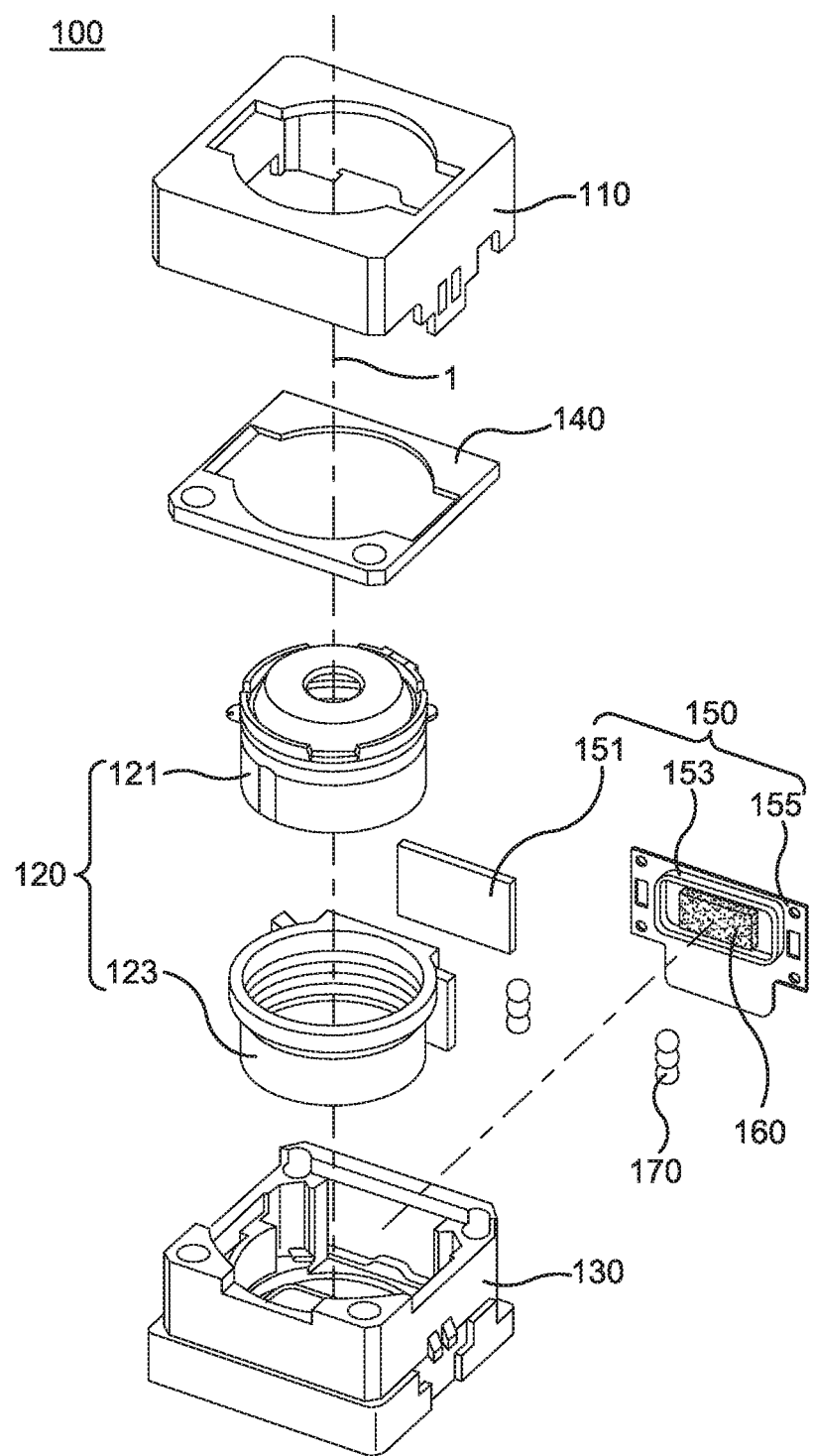
FIG. 1 is a perspective view of a camera module that may be formed in accordance with one embodiment of the present invention.

It is to be understood by one of ordinary skill in the art that the present discussion is a description of exemplary embodiments only, and is not intended as limiting the broader aspects of the present invention.

Generally speaking, the present invention is directed to a camera module that includes a housing within which a lens module is positioned that contains one or more lenses. An actuator assembly is configured to drive the movement of the lens module in an optical axis direction. The actuator assembly includes a guide unit (e.g., spring(s), ball bearing(s), etc.) positioned between the housing and the lens module to help guide the movement of the lens module in the desired direction. Notably, the guide unit contains a polymer composition having a unique combination of flexural strength and hardness that enables it to minimize the number of defects (e.g., dents) imparted onto the surface of the housing and/or lens module during movement of the lens module. More particularly, the polymer composition may exhibit a flexural modulus of about 7,000 MPa or more, in some embodiments from about 9,000 MPa or more, in some embodiments, from about 10,000 MPa to about 30,000 MPa, and in some embodiments, from about 12,000 MPa to about 25,000 MPa, as determined in accordance with ISO Test No. 178:2010 (technically equivalent to ASTM D790-10) at 23° C. The polymer composition may also exhibit a Rockwell surface hardness of about 25 or more, in some embodiments about 35 or more, in some embodiments about 45 or more, and in some embodiments, from about 55 to about 100, as determined in accordance with ASTM D785-08 (Scale M). Further, when subjected to the "ball dent" test described herein, the polymer composition may exhibit a dent of only about 50 micrometers or less, in some embodiments about 45 micrometers or less, in some embodiments from about 1 to about 40 micrometers, in some embodiments from about 1 to about 20 micrometers, in some embodiments from about 1 to about 10 micrometers, and in some embodiments, from about 1 to about 5 micrometers, as determined with a metal ball having a diameter of 1.5 mm and weight of 75 grams. Of course, when tested with balls of a smaller weight (e.g., 35 or 50 grams), the polymer composition may also exhibit a dent within the ranges noted above. In addition, when subjected to the "mini-drop" test described herein, the polymer composition may exhibit a dent of only about 50 micrometers or less, in some embodiments about 45 micrometers or less, in some embodiments from about 1 to about 40 micrometers, in some embodiments from about 1 to about 20 micrometers, in some embodiments from about 1 to about 10 micrometers, and in some embodiments, from about 1 to about 5 micrometers, as determined for 20,000 drops from a height of 150 millimeters with a metal ball having a diameter of 1.5 mm and weight of 5 grams. Of course, when tested with a smaller number of drops (e.g., 10,000 drops), the polymer composition may also exhibit a dent within the ranges noted above.

Of course in addition to those noted above, the polymer composition may also exhibit other good strength properties.

For example, the composition may exhibit a Charpy unnotched and/or notched impact strength of about 2 kJ/m², in some embodiments from about 4 to about 40 kJ/m², and in some embodiments, from about 8 to about 30 kJ/m², measured at 23° C. according to ISO Test No. 179-1:2010 (technically equivalent to ASTM D256-10e1). The composition may also exhibit a tensile strength of from about 20 to about 500 MPa, in some embodiments from about 50 to about 400 MPa, and in some embodiments, from about 60 to about 350 MPa; tensile break strain of about 0.5% or more, in some embodiments from about 0.8% to about 15%, and in some embodiments, from about 1% to about 10%; and/or tensile modulus of from about 5,000 MPa to about 30,000 MPa, in some embodiments from about 7,000 MPa to about 25,000 MPa, and in some embodiments, from about 10,000 MPa to about 20,000 MPa. The tensile properties may be determined in accordance with ISO Test No. 527:2012 (technically equivalent to ASTM D638-14) at 23° C. The composition may also exhibit a flexural strength of from about 40 to about 500 MPa, in some embodiments from about 50 to about 400 MPa, and in some embodiments, from about 100 to about 350 MPa and/or a flexural break strain of about 0.5% or more, in some embodiments from about 0.8% to about 15%, and in some embodiments, from about 1% to about 10%. The flexural properties may be determined in accordance with ISO Test No. 178:2010 (technically equivalent to ASTM D790-10) at 23° C. The composition may also exhibit a deflection temperature under load (DTUL) of about 180° C. or more, and in some embodiments, from about 190° C. to about 280° C., as measured according to ASTM D648-07 (technically equivalent to ISO Test No. 75-2:2013) at a specified load of 1.8 MPa.

Conventionally, it was believed that compositions having such good mechanical properties would also not possess a low friction surface. Contrary to conventional thought, however, the composition of the present invention has been found to possess a low degree of surface friction, which can minimize the extent to which a skin layer is peeled off during use of the guide unit. For example, the polymer composition may exhibit a dynamic coefficient of friction of about 1.0 or less, in some embodiments about 0.4 or less, in some embodiments about 0.35 or less, and in some embodiments, from about 0.1 to about 0.3, as determined in accordance with VDA 230-206:2007. Likewise, the wear depth may be about 500 micrometers or less, in some embodiments about 200 micrometers or less, in some embodiments about 100 micrometers or less, and in some embodiments, from about 10 to about 70 micrometers, as determined in accordance with VDA 230-206:2007.

In addition, the composition can also exhibit excellent antistatic behavior, particularly when an antistatic filler is included within the polymer composition as discussed above. Such antistatic behavior can be characterized by a relatively low surface and/or volume resistivity as determined in accordance with IEC 60093. For example, the composition may exhibit a surface resistivity of about $1 \times 10^{15}$ ohms or less, in some embodiments about $1 \times 10^{14}$ ohms or less, in some embodiments from about $1 \times 10^{10}$ ohms to about $9 \times 10^{13}$ ohms, and in some embodiments, from about $1 \times 10^{11}$ to about $1 \times 10^{13}$ ohms. Likewise, the composition may also exhibit a volume resistivity of about $1 \times 10^{15}$ ohm-m or less, in some embodiments from about $1 \times 10^{9}$ ohm-m to about $9 \times 10^{14}$ ohm-m, and in some embodiments, from about $1 \times 10^{10}$ to about $5 \times 10^{14}$ ohm-m. Of course, such antistatic behavior is by no means required. For example, in some embodiments, the composition may exhibit a relatively high surface resistivity, such as about $1 \times 10^{15}$ ohms or more, in some embodiments about $1 \times 10^{16}$ ohms or more, in some embodiments from about $1 \times 10^{17}$ ohms to about $9 \times 10^{30}$ ohms, and in some embodiments, from about $1 \times 10^{18}$ to about $1 \times 10^{26}$ ohms.

Various embodiments of the present invention will now be described in more detail.

I. Polymer Composition

A. Polymer Matrix

The polymer matrix typically contains one or more aromatic polymers, generally in an amount of from about 20 wt. % to about 70 wt. %, in some embodiments from about 30 wt. % to about 65 wt. %, and in some embodiments, from about 40 wt. % to about 60 wt. % of the polymer composition. The aromatic polymers may be considered "high performance" polymers in that they have a relatively high glass transition temperature and/or high melting temperature depending on the particular nature of the polymer. Such high performance polymers can thus provide a substantial degree of heat resistance to the resulting polymer composition. For example, the aromatic polymer may have a glass transition temperature of about 100° C. or more, in some embodiments about 120° C. or more, in some embodiments from about 140° C. to about 350° C., and in some embodiments, from about 150° C. to about 320° C. The aromatic polymer may also have a melting temperature of about 200° C. or more, in some embodiments from about 220° C. to about 350° C., and in some embodiments, from about 240° C. to about 300° C. The glass transition and melting temperatures may be determined as is well known in the art using differential scanning calorimetry ("DSC"), such as determined by ISO Test No. 11357-2:2013 (glass transition) and 11357-3:2011 (melting).

The aromatic polymer can be substantially amorphous, semi-crystalline, or crystalline in nature. One example of a suitable semi-crystalline aromatic polymer, for instance, is an aromatic or semi-aromatic polyamide. Aromatic polyamides typically contain repeating units held together by amide linkages (NH—CO) and are synthesized through the polycondensation of dicarboxylic acids (e.g., aromatic dicarboxylic acids), diamines (e.g., aliphatic diamines), etc. For example, the aromatic polyamide may contain aromatic repeating units derived from an aromatic dicarboxylic acid, such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, etc., as well as combinations thereof. Terephthalic acid is particularly suitable. Of course, it should also be understood that other types of acid units may also be employed, such as aliphatic dicarboxylic acid units, polyfunctional carboxylic acid units, etc. The aromatic polyamide may also contain aliphatic repeating units derived from an aliphatic diamine, which typically has from 4 to 14 carbon atoms. Examples of such diamines include linear aliphatic alkylenediamines, such as 1,4-tetramethylenediamine, 1,6-hexanediamine, 1,7-heptanediamine, 1,8-octanediamine, 1,9-nonanediamine, 1,10-decanediamine, 1,11-undecanediamine, 1,12-dodecanediamine, etc.; branched aliphatic alkylenediamines, such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, etc.; as well as combinations thereof. Repeating units derived from 1,9-nonanediamine and/or 2-methyl-1,8-octanediamine are particularly suitable.

Of course, other diamine units may also be employed, such as alicyclic diamines, aromatic diamines, etc.

Particularly suitable polyamides may include poly(non-amethylene terephthalamide) (PA9T), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(non-amethylene terephthalamide/12-aminododecanamide) (PA9T/12), poly(decamethylene terephthalamide/11-aminoundecanamide) (PA 10T/11), poly(decamethylene terephthalamide/12-aminododecanamide) (PA10T/12), poly(decamethylene terephthalamide/decamethylene decanediamide) (PA10T/1010), poly(decamethylene terephthalamide/decamethylene dodecanediamide) (PA10T/1012), poly(decamethylene terephlhalamide/tetramethylene hexanediamide) (PA10T/46), poly(decamethylene terephthalamide/caprolactam) (PA10T/6), poly(decamethylene terephthalamide/hexamethylene hexanediamide) (PA10T/66), poly(dodecamethylene lerephthalamide/dodecamelhylene dodecanediarnide) (PA12T/1212), poly(dodecamethylene terephthalamide/caprolactam) (PA12T/6), poly(dodecamethylene terephthalamide/hexamethylene hexanediamide) (PA12T/66), and so forth. Yet other examples of suitable aromatic polyamides are described in U.S. Pat. No. 8,324,307 to Harder, et al.

Another suitable semi-crystalline aromatic polymer that may be employed is an aromatic polyester that is a condensation product of an aromatic dicarboxylic acid having 8 to 14 carbon atoms and at least one diol. Suitable diols may include, for instance, neopentyl glycol, cyclohexanedimethanol, 2,2-dimethyl-1,3-propane diol and aliphatic glycols of the formula $HO(CH_2)_nOH$ where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalene-dicarboxylic acids. Particular examples of such aromatic polyesters include poly(ethylene terephthalate) (PET), poly(1,4-butylene terephthalate) (PBT), poly(1,3-propylene terephthalate) (PPT), poly(1,4-butylene 2,6-naphthalate) (PBN), poly(ethylene 2,6-naphthalate) (PEN), poly(1,4-cyclohexylenedimethylene terephthalate) (PCT), as well as copolymer, derivatives, and mixtures of the foregoing.

In addition, modified or copolymers of such aromatic polyesters may also be used. For instance, in one embodiment, a modifying acid or a modifying diol may be used to produce modified polyethylene terephthalate polymers and/or modified polybutylene terephthalate polymers. As used herein, the terms "modifying acid" and "modifying diol" are meant to define compounds, which can form part of the acid and diol repeat units of a polyester, respectively, and which can modify a polyester to reduce its crystallinity or render the polyester amorphous. Of course, the polyesters may be non-modified and do not contain a modifying acid or a modifying diol. In any event, examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-bis(2-hydroxyethoxy)benzene, 4,4'-bis(2-hydroxyethoxy) diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g., diethylene glycol, triethylene glycol, dipropylene glycol, tripropylene glycol, etc. In general, these diols contain 2 to 18, and in some embodiments, 2 to 8 carbon atoms. Cycloaliphatic diols can be employed in their cis- or trans-configuration or as mixtures of both forms.

Polyarylene sulfides are also suitable semi-crystalline aromatic polymers. The polyarylene sulfide may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

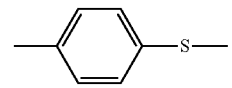

and segments having the structure of formula:

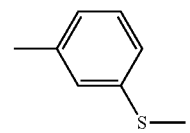

or segments having the structure of formula:

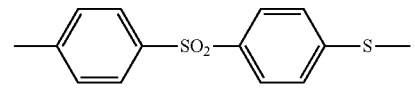

The polyarylene sulfide may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

As indicated above, substantially amorphous polymers may also be employed in the polymer composition that lack a distinct melting point temperature. Suitable amorphous polymers may include, for instance, polyphenylene oxide ("PPO"), aromatic polycarbonates, aromatic polyetherimides, etc. Aromatic polycarbonates, for instance, typically have a glass transition temperature of from about 130° C. to about 160° C. and contain aromatic repeating units derived from one or more aromatic diols. Particularly suitable aromatic diols are bisphenols, such as gem-bisphenols in which two phenols groups are attached to a single carbon atom of a bivalent connecting radical. Examples of such bisphenols may include, for instance, such as 4,4'-isopropylidenediphenol ("bisphenol A"), 4,4'-ethylidenediphenol, 4,4'-(4-chloro-a-methylbenzylidene)diphenol, 4,4'cyclohexylidenediphenol, 4,4 (cyclohexylmethylene)diphenol, etc., as well as combinations thereof. The aromatic diol may be reacted with a phosgene. For example, the phosgene may be a carbonyl chloride having the formula C(O)Cl$_2$. An alternative route to the synthesis of an aromatic polycarbonate may involve the transesterification of the aromatic diol (e.g., bisphenol) with a diphenyl carbonate.

In addition to the polymers referenced above, crystalline polymers may also be employed in the polymer composition. Particularly suitable are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). Such polymers may be formed from one or more types of repeating units as is known in the art. A liquid crystalline polymer may, for example, contain one or more aromatic ester repeating units generally represented by the following Formula (I):

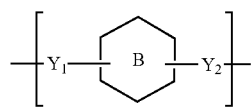

(I)

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 50 mol. % or more, in some embodiments about 60 mol. % or more, and in some embodiments, from about 80 mol. % to 100 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl) ether, bis(4-carboxyphenyl)butane, bis(4-carboxyphenyl) ethane, bis(3-carboxyphenyl)ether, bis(3-carboxyphenyl) ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 1 mol. % to about 50 mol. %, in some embodiments from about 2 mol. % to about 40 mol. %, and in some embodiments, from about 5 mol. % to about 30% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "high naphthenic" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically about 10 mol. % or more, in some embodiments about 15 mol. % or more, and in some embodiments, from about 20 mol. % to about 35 mol. % of the polymer. Contrary to many conventional "low naphthenic" polymers, it is believed that the resulting "high naphthenic" polymers are capable of exhibiting good thermal and mechanical properties. In one particular embodiment, for instance, the liquid crystalline polymer may be formed from repeating units derived from 4-hydroxybenzoic acid ("NBA") and 6-hydroxy-2-naphthoic acid ("HNA"), as well as various other optional constituents. The repeating units derived from 4-hydroxybenzoic acid ("NBA") may constitute from about 50 mol. % to about 90 mol. %, in some embodiments from about 60 mol. % to about 85 mol. %, and in some embodiments, from about 65 mol. % to about 80% of the polymer. The repeating units derived from 6-hydroxy-2-naphthoic acid ("HNA") may likewise constitute from about 10 mol. % to about 50 mol. %, in some embodiments from about 15 mol. % to about 40 mol. %, and in some embodiments, from about 20 mol. % to about 35% of the polymer.

In certain embodiments of the present invention, blends of aromatic polymers may also be employed to help achieve the desired properties of the polymer composition. For example, the polymer composition may contain a liquid crystalline polymer in combination with a semi-crystalline aromatic polyester, such as those described above. In one particular embodiment, for instance, the aromatic polyester may be a polyalkylene terephthalate, such as poly(1,4-cyclohexylenedimethylene terephthalate) (PCT), as well as copolymers and derivatives thereof. To help minimize the extent that the aromatic polyester reacts with the liquid crystalline polymer, it is generally desired that the content of carboxyl end groups in the polymer is kept relatively low, such as about 100 milliequivalents per kilogram ("meq/kg") or less, in some embodiments about 50 meq/kg or less, and in some embodiments, about 30 meq/kg or less. It is likewise generally desired that the content of hydroxyl end groups in the polymer is about 100 meq/kg or less, in some embodiments about 50 meq/kg or less, and in some embodiments, about 30 meq/kg or less. The content of carboxyl and hydroxyl end groups may be determined by any known technique, such as by titration methods (e.g., potentiometry).

When such a blend is employed, liquid crystalline polymers may constitute from about 30 wt. % to about 85 wt. %, in some embodiments from about 40 wt. % to about 80 wt. %, and in some embodiments, from about 60 wt. % to about 75 wt. % of the blend, while the semi-crystalline aromatic polyesters may likewise constitute from about 15 wt. % to about 70 wt. %, in some embodiments from about 20 wt. % to about 60 wt. %, and in some embodiments, from about 25 wt. % to about 40 wt. % of the blend. Liquid crystalline polymers may, for instance, may constitute from about 15 wt. % to about 85 wt. %, in some embodiments from about 20 wt. % to about 75 wt. %, and in some embodiments, from about 30 wt. % to about 50 wt. % of the entire polymer composition, while the semi-crystalline aromatic polyesters may likewise constitute from about 1 wt. % to about 50 wt. %, in some embodiments from about 5 wt. % to about 45 wt. %, and in some embodiments, from about 10 wt. % to about 40 wt. % of the entire polymer composition.

B. Mineral Filler

As indicated above, the polymer composition contains one or more mineral fillers distributed within the polymer matrix. Such mineral filler(s) typically constitute from about 20 to about 100 parts, in some embodiments from about 35 to about 90 parts, and in some embodiments, from about 50 to about 80 parts by weight per 100 parts by weight of the polymer matrix. The mineral filler(s) may, for instance, constitute from about 5 wt. % to about 60 wt. %, in some embodiments from about 10 wt. % to about 55 wt. %, and in some embodiments, from about 25 wt. % to about 40 wt. % of the polymer composition.

The nature of the mineral filler(s) employed in the polymer composition may vary, such as mineral particles, mineral fibers (or "whiskers"), etc., as well as blends thereof. Typically, the mineral filler(s) employed in the polymer composition have a certain hardness value to help improve the mechanical strength, adhesive strength, and surface properties of the composition, which enables the composition to be uniquely suited to form the small guide units of a camera module. For instance, the hardness values may be about 2.0 or more, in some embodiments about 2.5 or more, in some embodiments about 3.0 or more, in some embodiments from about 3.0 to about 11.0, in some embodiments from about 3.5 to about 11.0, and in some embodiments, from about 4.5 to about 6.5 based on the Mohs hardness scale. In certain embodiments, for instance, the polymer composition may contain a blend of mineral particles and mineral fibers. When such a blend is employed, mineral fibers may constitute from about 25 wt. % to about 70 wt. %, in some embodiments from about 30 wt. % to about 60 wt. %, and in some embodiments from about 35 wt. % to about 50 wt. % of the blend, while mineral particles may likewise constitute from about 30 wt. % to about 75 wt. %, in some embodiments from about 40 wt. % to about 70 wt. %, and in some embodiments, from about 50 wt. % to about 65 wt. % of the blend. Mineral fibers may, for instance, may constitute about 1 wt. % to about 40 wt. %, in some embodiments from about 3 wt. % to about 30 wt. %, and in some embodiments, from about 5 wt. % to about 20 wt. % of the entire polymer composition, while mineral particles may likewise constitute from about 2 wt. % to about 50 wt. %, in some embodiments from about 5 wt. % to about 40 wt. %, in some embodiments from about 5 wt. % to about 30 wt. %, and in some embodiments, from about 10 wt. % to about 30 wt. % of the entire polymer composition.

Any of a variety of different types of mineral particles may generally be employed in the polymer composition, such as those formed from a natural and/or synthetic silicate mineral, such as talc, mica, silica, alumina, halloysite, kaolinite, illite, montmorillonite, vermiculite, palygorskite, pyrophyllite, calcium silicate, aluminum silicate, wollastonite, etc.; sulfates; carbonates; phosphates; fluorides, borates; and so forth. Particularly suitable are particles having the desired hardness value, such as calcium carbonate ($CaCO_3$, Mohs hardness of 3.0), copper carbonate hydroxide ($Cu_2CO_3(OH)_2$, Mohs hardness of 4.0); calcium fluoride ($CaF_2$, Mohs hardness of 4.0); calcium pyrophosphate ($Ca_2P_2O_7$, Mohs hardness of 5.0), anhydrous dicalcium phosphate ($CaHPO_4$, Mohs hardness of 3.5), hydrated aluminum phosphate ($AlPO_4.2H_2O$, Mohs hardness of 4.5); silica ($SiO_2$, Mohs hardness of 5.0-6.0), potassium aluminum silicate ($KAlSi_3O_8$, Mohs hardness of 6), copper silicate ($CuSiO_3.H_2O$, Mohs hardness of 5.0); calcium borosilicate hydroxide ($Ca_2B_5SiO_9(OH)_5$, Mohs hardness of 3.5); alumina ($AlO_2$, Mohs hardness of 10.0); calcium sulfate ($CaSO_4$, Mohs hardness of 3.5), barium sulfate ($BaSO_4$, Mohs hardness of from 3 to 3.5), mica (Mohs hardness of 2.5-5.3), and so forth, as well as combinations thereof. Mica, for instance, is particularly suitable. Any form of mica may generally be employed, including, for instance, muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite $(K,Na)(Al,Mg,Fe)_2(Si,Al)_4O_{10}(OH)_2$), etc. Muscovite-based mica is particularly suitable for use in the polymer composition.

In certain embodiments, the mineral particles, such as barium sulfate and/or calcium sulfate particles, may have a shape that is generally granular or nodular in nature. In such embodiments, the particles may have a median size (e.g., diameter) of from about 0.5 to about 20 micrometers, in some embodiments from about 1 to about 15 micrometers, in some embodiments from about 1.5 to about 10 micrometers, and in some embodiments, from about 2 to about 8 micrometers, such as determined using laser diffraction techniques in accordance with ISO 13320:2009 (e.g., with a Horiba LA-960 particle size distribution analyzer). In other embodiments, it may also be desirable to employ flake-shaped mineral particles, such as mica particles, that have a relatively high aspect ratio (e.g., average diameter divided by average thickness), such as about 4 or more, in some embodiments about 8 or more, and in some embodiments, from about 10 to about 500. In such embodiments, the average diameter of the particles may, for example, range from about 5 micrometers to about 200 micrometers, in some embodiments from about 8 micrometers to about 150 micrometers, and in some embodiments, from about 10 micrometers to about 100 micrometers. The average thickness may likewise be about 2 micrometers or less, in some embodiments from about 5 nanometers to about 1 micrometer, and in some embodiments, from about 20 nanometers to about 500 nanometers such as determined using laser diffraction techniques in accordance with ISO 13320:2009 (e.g., with a Horiba LA-960 particle size distribution analyzer). The mineral particles may also have a narrow size distribution. That is, at least about 70% by volume of the particles, in some embodiments at least about 80% by volume of the particles, and in some embodiments, at least about 90% by volume of the particles may have a size within the ranges noted above.

Suitable mineral fibers may likewise include those that are derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are fibers having the desired hardness value, including fibers derived from inosilicates, such as wollastonite (Mohs hardness of 4.5 to 5.0), which are commercially available from Nyco Minerals under the trade designation Nyglos® (e.g., Nyglos® 4 W or Nyglos® 8). The mineral fibers may have a median width (e.g., diameter) of from about 1 to about 35 micrometers, in some embodiments from about 2 to about 20 micrometers, in some embodiments from about 3 to about 15 micrometers, and in some embodiments, from about 7 to about 12 micrometers. The mineral fibers may also have a narrow size distribution. That is, at least about 60% by volume of the fibers, in some embodiments at least about 70% by volume of the fibers, and in some embodiments, at least about 80% by volume of the fibers may have a size within the ranges noted above. Without intending to be limited by theory, it is believed that mineral fibers having the size characteristics noted above can more readily move through molding equipment, which enhances the distribution within the polymer matrix and minimizes the creation of surface defects. In addition to possessing the size characteristics noted above, the mineral fibers may also have a relatively high aspect ratio (average length divided by median width) to help further improve the mechanical properties and surface quality of the resulting polymer composition. For example, the mineral fibers may have an aspect ratio of from about 2 to about 100, in some embodiments from about 2 to about 50, in some embodiments from about 3 to about 20, and in some embodiments, from about 4 to about 15. The volume average length of such mineral fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

C. Optional Components i. Glass Fibers

One beneficial aspect of the present invention is that good mechanical properties may be achieved without adversely impacting the dimensional stability of the resulting part. To help ensure that this dimensional stability is maintained, it is generally desirable that the polymer composition remains substantially free of conventional fibrous fillers, such as glass fibers. Thus, if employed at all, glass fibers typically constitute no more than about 10 wt. %, in some embodiments no more than about 5 wt. %, and in some embodiments, from about 0.001 wt. % to about 3 wt. % of the polymer composition.

ii. Impact Modifier

If desired, an impact modifier may be employed in the polymer composition to help improve the impact strength and flexibility of the polymer composition. When employed, impact modifiers typically constitute from about 0.1 to about 20 parts, in some embodiments from about 0.5 to about 15 parts, and in some embodiments, from about 1 to about 10 parts by weight per 100 parts by weight of the polymer matrix. For instance, impact modifiers may constitute from about 0.1 wt. % to about 15 wt. %, in some embodiments from about 0.2 wt. % to about 12 wt. %, and in some embodiments, from about 0.5 wt. % to about 10 wt. % of the polymer composition.

In certain embodiments, for instance, the impact modifier may be a polymer that contains an olefinic monomeric unit that derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The olefin polymer may be in the form of a copolymer that contains other monomeric units as known in the art. For example, another suitable monomer may include a "(meth)acrylic" monomer, which includes acrylic and methacrylic monomers, as well as salts or esters thereof, such as acrylate and methacrylate monomers. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one embodiment, for instance, the impact modifier may be an ethylene methacrylic acid copolymer ("EMAC"). When employed, the relative portion of the monomeric component(s) may be selectively controlled. The α-olefin monomer(s) may, for instance, constitute from about 55 wt. % to about 95 wt. %, in some embodiments from about 60 wt. % to about 90 wt. %, and in some embodiments, from about 65 wt. % to about 85 wt. % of the copolymer. Other monomeric components (e.g., (meth)acrylic monomers) may constitute from about 5 wt. % to about 35 wt. %, in some embodiments from about 10 wt. % to about 32 wt. %, and in some embodiments, from about 15 wt. % to about 30 wt. % of the copolymer.

Other suitable olefin copolymers may be those that are "epoxy-functionalized" in that they contain, on average, two or more epoxy functional groups per molecule. The copolymer may also contain an epoxy-functional monomeric unit. One example of such a unit is an epoxy-functional (meth)acrylic monomeric component. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethylacrylate, and glycidyl itoconate. Other suitable monomers may also be employed to help achieve the desired molecular weight. In one particular embodiment, for example, the copolymer may be a terpolymer formed from an epoxy-functional (meth)acrylic monomeric component, a-olefin monomeric component, and non-epoxy functional (meth)acrylic monomeric component. The copolymer may, for instance, be poly(ethylene-co-butylacrylate-co-glycidyl methacrylate). When employed, the epoxy-functional (meth)acrylic monomer(s) typically constitutes from about 1 wt. % to about 20 wt. %, in some embodiments from about 2 wt. % to about 15 wt. %, and in some embodiments, from about 3 wt. % to about 10 wt. % of the copolymer.

iii. Epoxy Resin

Epoxy resins may also be employed in certain embodiments, such as to help minimize the degree to which blends of aromatic polymers (e.g., liquid crystalline polymer and semi-crystalline aromatic polyester) react together during formation of the polymer composition. When employed, epoxy resins typically constitute from about 0.01 to about 5 parts, in some embodiments from about 0.05 to about 4 parts, and in some embodiments, from about 0.1 to about 2 parts by weight per 100 parts of the polymer matrix. For instance, epoxy resins may constitute from about 0.01 wt. % to about 5 wt. %, in some embodiments from about 0.1 wt. % to about 4 wt. %, and in some embodiments, from about 0.3 wt. % to about 2 wt. % of the polymer composition.

Epoxy resins have a certain epoxy equivalent weight may be particularly effective for use in the polymer composition. Namely, the epoxy equivalent weight is generally from about 250 to about 1,500, in some embodiments from about 400 to about 1,000, and in some embodiments, from about 500 to about 800 grams per gram equivalent as determined in accordance with ASTM D1652-11e1. The epoxy resin also typically contains, on the average, at least about 1.3, in some embodiments from about 1.6 to about 8, and in some embodiments, from about 3 to about 5 epoxide groups per molecule. The epoxy resin also typically has a relatively low dynamic viscosity, such as from about 1 centipoise to about 25 centipoise, in some embodiments 2 centipoise to about 20 centipoise, and in some embodiments, from about 5 centipoise to about 15 centipoise, as determined in accordance with ASTM D445-15 at a temperature of 25° C. At room temperature (25° C.), the epoxy resin is also typically a solid or semi-solid material having a melting point of from about 50° C. to about 120° C., in some embodiments from about 60° C. to about 110° C., and in some embodiments, from about 70° C. to about 100° C.

The epoxy resin can be saturated or unsaturated, linear or branched, aliphatic, cycloaliphatic, aromatic or heterocyclic, and may bear substituents which do not materially interfere with the reaction with the oxirane. Suitable epoxy resins include, for instance, glycidyl ethers (e.g., diglycidyl ether) that are prepared by reacting an epichlorohydrin with a hydroxyl compound containing at least 1.5 aromatic hydroxyl groups, optionally under alkaline reaction conditions. Multi-functional compounds are particularly suitable. For instance, the epoxy resin may be a diglycidyl ether of a dihydric phenol, diglycidyl ether of a hydrogenated dihydric phenol, triglycidyl ether of a trihydric phenol, triglycidyl ether of a hydrogenated trihydric phenol, etc. Diglycidyl ethers of dihydric phenols may be formed, for example, by reacting an epihalohydrin with a dihydric phenol. Examples of suitable dihydric phenols include, for instance, 2,2-bis(4-hydroxyphenyl) propane ("bisphenol A"); 2,2-bis 4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5 dihydroxynaphthalene; 1,1-bis(4-hydroxy-3-alkylphenyl) ethane, etc. Suitable dihydric phenols can also be obtained from the reaction of phenol with aldehydes, such as formaldehyde) ("bisphenol F"). Commercial available examples of such multi-functional epoxy resins may include Epon™ resins available from Hexion under the designations 862, 828, 826, 825, 1001, 1002, 1009, SU3, 154, 1031, 1050, 133, and 165. Other suitable multi-functional epoxy resins are available from Huntsman under the trade designation Araldite™ (e.g., Araldite™ ECN 1273 and Araldite™ ECN 1299.

iv. Antistatic Filler

An antistatic filler may also be employed in the polymer composition to help reduce the tendency to create a static electric charge during a molding operation, transportation, collection, assembly, etc. Such fillers, when employed, typically constitute from about 0.1 to about 20 parts, in some embodiments from about 0.2 to about 10 parts, and in some embodiments, from about 0.5 to about 5 parts by weight per 100 parts by weight of the polymer matrix. For instance, the antistatic filler may constitute from about 0.1 wt. % to about 10 wt. %, in some embodiments from about 0.2 wt. % to about 8 wt. %, and in some embodiments, from about 0.5 wt. % to about 4 wt. % of the polymer composition.

Any of a variety of antistatic fillers may generally be employed in the polymer composition to help improve its antistatic characteristics. Examples of suitable antistatic fillers may include, for instance, metal particles (e.g., aluminum flakes), metal fibers, carbon particles (e.g., graphite, expanded graphite, grapheme, carbon black, graphitized carbon black, etc.), carbon nanotubes, carbon fibers, and so forth. In one embodiment, for instance, the antistatic filler ay be an ionic liquid. One benefit of such a material is that, in addition to being an antistatic agent, the ionic liquid can also exist in liquid form during melt processing, which allows it to be more uniformly blended within the polymer matrix. This improves electrical connectivity and thereby enhances the ability of the composition to rapidly dissipate static electric charges from its surface. The ionic liquid is generally a salt that has a low enough melting temperature so that it can be in the form of a liquid when melt processed with the liquid crystalline polymer. For example, the melting temperature of the ionic liquid may be about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, quaternary oniums having the following structures:

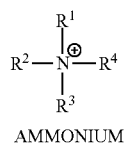
AMMONIUM

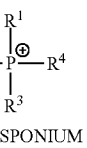
PHOSPONIUM

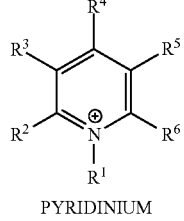
PYRIDINIUM

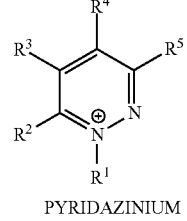
PYRIDAZINIUM

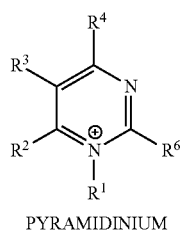
PYRAMIDINIUM

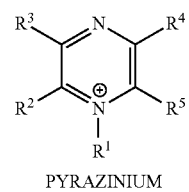
PYRAZINIUM

-continued

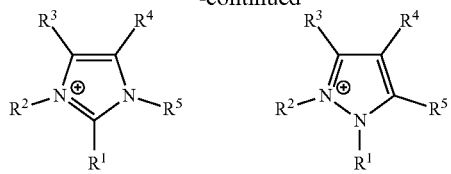
IMIDAZOLIUM   PYRAZOLIUM

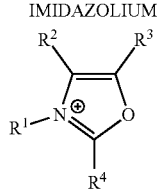
OXAZOLIUM

1,2,3-TRIAZOLIUM

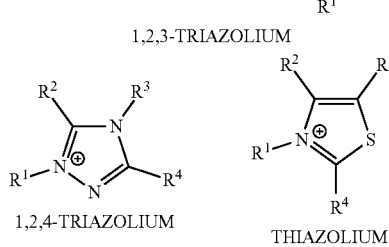
1,2,4-TRIAZOLIUM   THIAZOLIUM

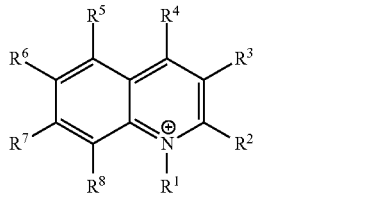
QUINOLINIUM

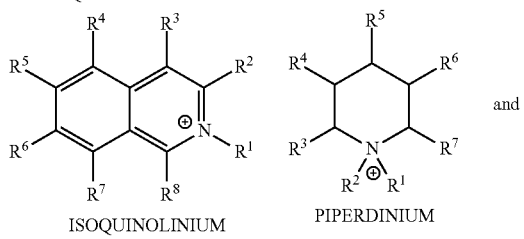
ISOQUINOLINIUM   PIPERDINIUM

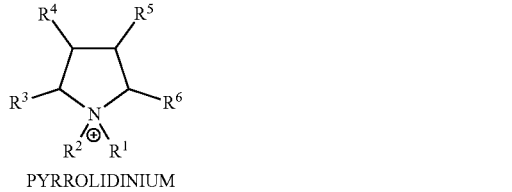
PYRROLIDINIUM and wherein, $R^1$, $R^2$, $R^3$, $R^4$, $R^5$, $R^6$, $R^7$, and $R^8$ are independently selected from the group consisting of hydrogen; substituted or unsubstituted $C_1$-$C_{10}$ alkyl groups (e.g., methyl, ethyl, n-propyl, isopropyl, n-butyl, isobutyl, sec-butyl, tert-butyl, n-pentyl, etc.); substituted or unsubstituted $C_3$-$C_{14}$ cycloalkyl groups (e.g., adamantyl, cyclopropyl, cyclobutyl, cyclopentyl, cyclooctyl, cyclohexyl, etc.); substituted or unsubstituted alkenyl groups (e.g., ethylene, propylene, 2-methypropylene, pentylene, etc.); substituted or unsubstituted $C_2$-$C_{10}$ alkynyl groups (e.g., ethynyl, propynyl, etc.); substituted or unsubstituted alkoxy groups (e.g., methoxy, ethoxy, n-propoxy, isopropoxy, n-butoxy, t-butoxy, sec-butoxy, n-pentoxy, etc.); substituted or unsubstituted acyloxy groups (e.g., methacryloxy, methacryloxyethyl, etc.); substituted or unsubstituted aryl groups (e.g., phenyl); substituted or unsubstituted heteroaryl groups (e.g., pyridyl, furanyl, thienyl, thiazolyl, isothiazolyl, triazolyl, imidazolyl, isoxazolyl, pyrrolyl, pyrazolyl, pyridazinyl, pyrimidinyl, quinolyl, etc.); and so forth. In one particular embodiment, for example, the cationic species may be an ammonium compound having the structure $N^+R^1R^2R^3R^4$, wherein $R^1$, $R^2$, and/or $R^3$ are independently a $C_1$-$C_6$ alkyl (e.g., methyl, ethyl, butyl, etc.) and $R^4$ is hydrogen or a $C_1$-$C_4$ alkyl group (e.g., methyl or ethyl). For example, the cationic component may be tri-butylmethylammonium, wherein $R^1$, $R^2$, and $R^3$ are butyl and $R^4$ is methyl.

Suitable counterions for the cationic species may include, for example, halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing. To help improve compatibility with the liquid crystalline polymer, it may be desired to select a counterion that is generally hydrophobic in nature, such as imides, fatty acid carboxylates, etc. Particularly suitable hydrophobic counterions may include, for instance, bis(pentafluoroethylsulfonyl)imide, bis(trifluoromethylsulfonyl)imide, and bis(trifluoromethyl)imide.

v. Tribological Formulation

A tribological formulation may also be employed in the polymer composition, typically in an amount of from about 1 to about 30 parts, in some embodiments from about 2 to about 15 parts, and in some embodiments, from about 4 to about 12 parts per 100 parts of aromatic polymer(s) employed in the polymer composition. For example, the tribological formulation may constitute from about 1 wt. % to about 30 wt. %, in some embodiments from about 2 wt. % to about 25 wt. %, and in some embodiments, from about 4 wt. % to about 10 wt. % of the polymer composition.

The tribological formulation may contain a siloxane polymer that improves internal lubrication and that also helps to bolster the wear and friction properties of the composition encountering another surface. Such siloxane polymers typically constitute from about 0.1 to about 20 parts, in some embodiments from about 0.4 to about 10 parts, and in some embodiments, from about 0.5 to about 5 parts per 100 parts of aromatic polymer(s) employed in the composition. Any of a variety of siloxane polymers may generally be employed in the tribological formulation. The siloxane polymer may, for instance, encompass any polymer, co-polymer or oligomer that includes siloxane units in the backbone having the formula:

$$R_r-SiO_{(4-r/2)}$$

wherein

R is independently hydrogen or substituted or unsubstituted hydrocarbon radicals, and r is 0, 1, 2 or 3.

Some examples of suitable radicals R include, for instance, alkyl, aryl, alkylaryl, alkenyl or alkynyl, or cycloalkyl groups, optionally substituted, and which may be interrupted by heteroatoms, i.e., may contain heteroatom(s) in the carbon chains or rings. Suitable alkyl radicals, may include, for instance, methyl, ethyl, n-propyl, isopropyl, n-butyl, isobutyl, tert-butyl, n-pentyl, isopentyl, neopentyl and tert-pentyl radicals, hexyl radicals (e.g., n-hexyl), heptyl radicals (e.g., n-heptyl), octyl radicals (e.g., n-octyl), isooctyl radicals (e.g., 2,2,4-trimethylpentyl radical), nonyl radicals (e.g., n-nonyl), decyl radicals (e.g., n-decyl), dodecyl radicals (e.g., n-dodecyl), octadecyl radicals (e.g., n-octadecyl), and so forth. Likewise, suitable cycloalkyl radicals may include cyclopentyl, cyclohexyl cycloheptyl radicals, methylcyclohexyl radicals, and so forth; suitable aryl radicals may include phenyl, biphenyl, naphthyl, anthryl, and phenanthryl radicals; suitable alkylaryl radicals may include o-, m- or p-tolyl radicals, xylyl radicals, ethylphenyl radicals, and so forth; and suitable alkenyl or alkynyl radicals may include vinyl, 1-propenyl, 1-butenyl, 1-pentenyl, 5-hexenyl, butadienyl, hexadienyl, cyclopentenyl, cyclopentadienyl, cyclohexenyl, ethynyl, propargyl 1-propynyl, and so forth. Examples of substituted hydrocarbon radicals are halogenated alkyl radicals (e.g., 3-chloropropyl, 3,3,3-trifluoropropyl, and perfluorohexylethyl) and halogenated aryl radicals (e.g., p-chlorophenyl and p-chlorobenzyl). In one particular embodiment, the siloxane polymer includes alkyl radicals (e.g., methyl radicals) bonded to at least 70 mol % of the Si atoms and optionally vinyl and/or phenyl radicals bonded to from 0.001 to 30 mol % of the Si atoms. The siloxane polymer is also preferably composed predominantly of diorganosiloxane units. The end groups of the polyorganosiloxanes may be trialkylsiloxy groups, in particular the trimethylsiloxy radical or the dimethylvinylsiloxy radical. However, it is also possible for one or more of these alkyl groups to have been replaced by hydroxy groups or alkoxy groups, such as methoxy or ethoxy radicals. Particularly suitable examples of the siloxane polymer include, for instance, dimethylpolysiloxane, phenylmethylpolysiloxane, vinylmethylpolysiloxane, and trifluoropropylpolysiloxane.

The siloxane polymer may also include a reactive functionality on at least a portion of the siloxane monomer units of the polymer, such as one or more of vinyl groups, hydroxyl groups, hydrides, isocyanate groups, epoxy groups, acid groups, halogen atoms, alkoxy groups (e.g., methoxy, ethoxy and propoxy), acyloxy groups (e.g., acetoxy and octanoyloxy), ketoximate groups (e.g., dimethylketoxime, methylketoxime and methylethylketoxime), amino groups (e.g., dimethylamino, diethylamino and butylamino), amido groups (e.g., N-methylacetamide and N-ethylacetamide), acid amido groups, amino-oxy groups, mercapto groups, alkenyloxy groups (e.g., vinyloxy, isopropenyloxy, and 1-ethyl-2-methylvinyloxy), alkoxyalkoxy groups (e.g., methoxyethoxy, ethoxyethoxy and methoxypropoxy), aminoxy groups (e.g., dimethylaminoxy and diethylaminoxy), mercapto groups, etc.

Regardless of its particular structure, the siloxane polymer may have a relatively high molecular weight, which reduces the likelihood that it migrates or diffuses to the surface of the polymer composition and thus further minimizes the likelihood of phase separation. For instance, the siloxane polymer typically has a weight average molecular weight of about 100,000 grams per mole or more, in some embodiments about 200,000 grams per mole or more, and in some embodiments, from about 500,000 grams per mole to about 2,000,000 grams per mole. The siloxane polymer may also have a relative high kinematic viscosity, such as about 10,000 centistokes or more, in some embodiments about 30,000 centistokes or more, and in some embodiments, from about 50,000 to about 500,000 centistokes.

If desired, silica particles (e.g., fumed silica) may also be employed in combination with the siloxane polymer to help improve its ability to be dispersed within the composition. Such silica particles may, for instance, have a particle size of from about 5 nanometers to about 50 nanometers, a surface area of from about 50 square meters per gram ($m^2/g$) to about 600 $m^2/g$, and/or a density of from about 160 kilogram per cubic meter ($kg/m^3$) to about 190 $kg/m^3$. When employed, the silica particles typically constitute from about 1 to about 100 parts, and in some some embodiments, from about 20 to about 60 parts by weight based on 100 parts by weight of the siloxane polymer. In one embodiment, the silica particles can be combined with the siloxane polymer prior to addition of this mixture to the polymer composition. For instance, a mixture including an ultrahigh molecular weight polydimethylsiloxane and fumed silica can be incorporated in the polymer composition. Such a pre-formed mixture is available as Genioplast® Pellet S from Wacker Chemie, AG.

The tribological formulation may also contain other components that can help the resulting polymer composition to achieve a good combination of low friction and good wear resistance. In one embodiment, for instance, the tribological formulation may employ a fluorinated additive in combination with the siloxane polymer. Without intending to be limited by theory, it is believed that the fluorinated additive can, among other things, improve the processing of the composition, such as by providing better mold filling, internal lubrication, mold release, etc. When employed, the weight ratio of the fluorinated additive to the siloxane polymer is typically from about 0.5 to about 12, in some embodiments from about 0.8 to about 10, and in some embodiments, from about 1 to about 6. For example, the fluorinated additive may constitute from about 0.1 to about 20 parts, in some embodiments from about 0.5 to about 15 parts, and in some embodiments from about 1 to about 10 parts per 100 parts of aromatic polymer(s) employed in the composition.

In certain embodiments, the fluorinated additive may include a fluoropolymer, which contains a hydrocarbon backbone polymer in which some or all of the hydrogen atoms are substituted with fluorine atoms. The backbone polymer may polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene, vinylidene fluoride, hexafluoropropylene, chlorotrifluoroethylene, perfluoroethylvinyl ether, perfluoromethylvinyl ether, perfluoropropylvinyl ether, etc., as well as mixtures thereof. Specific examples of suitable fluoropolymers include polytetrafluoroethylene, perfluoroalkylvinyl ether, poly(tetrafluoroethylene-co-perfluoroalkyvinylether), fluorinated ethylene-propylene copolymer, ethylene-tetrafluoroethylene copolymer, polyvinylidene fluoride, polychlorotrifluoroethylene, etc., as well as mixtures thereof.

The fluorinated additive may contain only the fluoropolymer, or it may also include other ingredients, such as those that aid in its ability to be uniformly dispersed within the polymer composition. In one embodiment, for example, the fluorinated additive may include a fluoropolymer in combination with a plurality of carrier particles. In such embodiments, for instance, the fluoropolymer may be coated onto the carrier particles. Silicate particles are particularly suitable for this purpose, such as talc ($Mg_3Si_4O_{10}(OH)_2$), halloysite ($Al_2Si_2O_5(OH)_4$), kaolinite ($Al_2Si_2O_5(OH)_4$), illite ($(K, H_3O)(Al, Mg, Fe)_2(Si,Al)_4O_{10}[(OH)_2,(H_2O)]$), montmorillonite ($Na, Ca)_{0.33}(Al, Mg)_2Si_4O_{10}(OH)_2 \cdot nH_2O$), vermiculite (($MgFe, A_1)_3(Al, Si)_4O_{10}(OH)_2 \cdot 4H_2O$), palygorskite (($Mg, A_1)_2Si_4O_{10}(OH) \cdot 4(H_2O)$), pyrophyllite ($Al_2Si_4O_{10}(OH)_2$), calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K, Na)(Al, Mg, Fe)_2(Si, A_1)_4O_{10}(OH)_2$), etc., as well as combinations thereof. The carrier particles may have an average particle size of from about 5 to about 50 micrometers, and in some embodiments, from about 10 to 20 micrometers. If desired, the carrier particles may also be in the shape of plate-like particles in that the ratio of its major axis to thickness is 2 or more.

vi. Other Additives

A wide variety of additional additives can also be included in the polymer composition, such as lubricants, thermally conductive fillers, pigments, antioxidants, stabilizers, surfactants, waxes, flame retardants, anti-drip additives, nucleating agents (e.g., boron nitride) and other materials added to enhance properties and processability. Lubricants, for example, may be employed in the polymer composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecanoic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N, N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

II. Formation

The components of the polymer composition (e.g., aromatic polymer(s), mineral filler(s), etc.) may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 30 to about 400 Pa-s, in some embodiments from about 40 to about 250 Pa-s, in some embodiments from about 50 to about 220 Pa-s, and in some embodiments, from about 60 to about 200 Pa-s, determined at a shear rate of 400 seconds$^{-1}$. Melt viscosity may be determined in accordance with ISO Test No. 11443:2005 at a temperature that is 15° C. higher than the melting temperature of the composition (e.g., about 305° C.).

III. Camera Module

As indicated above, the polymer composition of the present invention is employed in the actuator assembly (e.g., guide unit) of a camera module. The particular configuration of the camera module may vary as is known to those skilled in the art. Referring to FIG. 1, for example, one embodiment of a camera module 100 is shown that contains a lens module 120 that is contained within a housing, wherein the lens module 120 contains a lens barrel 121 coupled to a lens holder 123. The lens barrel 121 may have a hollow cylindrical shape so that a plurality of lenses for imaging an object may be accommodated therein in an optical axis direction 1. The lens barrel 121 may be inserted into a hollow cavity provided in the lens holder 123, and the lens barrel 121 and the lens holder 123 may be coupled to each other by a fastener (e.g., screw), adhesive, etc. The lens module 120, including the lens barrel 121, may be moveable in in the optical axis direction 1 (e.g., for auto-focusing) by an actuator assembly 150. In the illustrated embodiment, for example, the actuator assembly 150 may include a magnetic body 151 and a coil 153 configured to move the lens module 120 in the optical axis direction 1. The magnetic body 151 may be mounted on one side of the lens holder 123, and the coil 153 may be disposed to face the magnetic body 151. The coil 153 may be mounted on a substrate 155, which is in turn may be mounted to the housing 130 so that the coil 153 faces the magnetic body 151. The actuator assembly 150 may include a drive device 160 that is mounted on the substrate 155 and that outputs a signal (e.g., current) for driving the actuator assembly 150 depending on a control input signal. The actuator assembly 150 may receive the signal and generate a driving force that moves the lens module 120 in the optical axis direction 1. If desired, a stopper 140 may also be mounted on the housing 130 to limit a moving distance of the lens module 120 in the optical axis direction 1. Further, a shield case 110 (e.g., metal) may also be coupled to the housing 130 to enclose outer surfaces of the housing 130, and thus block electromagnetic waves generated during driving of the camera module 100.

As indicated above, the actuator assembly of the camera module also includes a guide unit containing the polymer composition of the present invention and that is positioned between the housing and the lens module to help guide the movement of the lens module. Any of a variety of guide units may be employed as known in the art, such as spring(s), ball bearing(s), electrostatic force generators, hydraulic force generators, etc. For example, springs can be employed that generate a preload force that acts on the lens module and guides it into the desired optical axis direction. Alternatively, as illustrated in the embodiment shown in FIG. 1, ball bearings 170 may act as a guide unit of the actuator assembly 150. More specifically, the ball bearings 170 may contact an outer surface of the lens holder 123 and an inner surface of the housing 130 to guide the movement of the lens module 120 in the optical axis direction 1. That is, the ball bearings 170 may be disposed between the lens holder 123 and the housing 130, and may guide the movement of the lens module 120 in the optical axis direction through a rolling motion.

Any number of ball bearings 170 may generally be employed for this purpose, such as 2 or more, in some embodiments from 3 to 20, and in some embodiments, from 4 to 12. The ball bearings 170 may be spaced part or in contact with each other, and may also be stacked in a direction perpendicular to the optical axis direction 1. The size of the ball bearings 170 may vary as is known to those skilled in the art. Due to the enhanced strength properties of the polymer composition of the present invention, however, it is possible to use relatively small ball bearings while achieving the same degree of structural integrity as larger bearings. Such smaller ball bearings may, for instance, have an average size (e.g., diameter) of about 800 micrometers or less, in some embodiments about 600 micrometers or less, in some embodiments about 400 micrometers or less, and in some embodiments, from about 50 to about 200 micrometers.

The guide unit may be formed using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

In addition to being employed in the guide unit, the polymer composition of the present invention may also be employed in any other portion of the camera module. Referring again to FIG. 1, for instance, the polymer composition may be used to form all or a portion of the housing 130, lens barrel 121, lens holder 123, substrate 155, stopper 140, shield case 110, and/or any other portion of the camera module.

Figure 2:
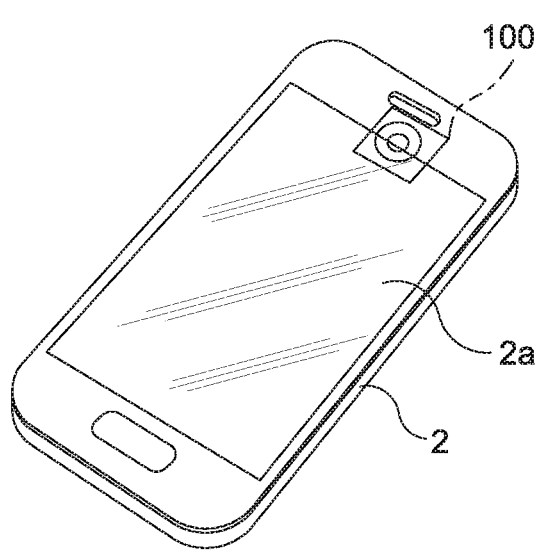
FIG. 2 is a top perspective view of one embodiment of an electronic device containing the camera module of the present invention.
Figure 3:
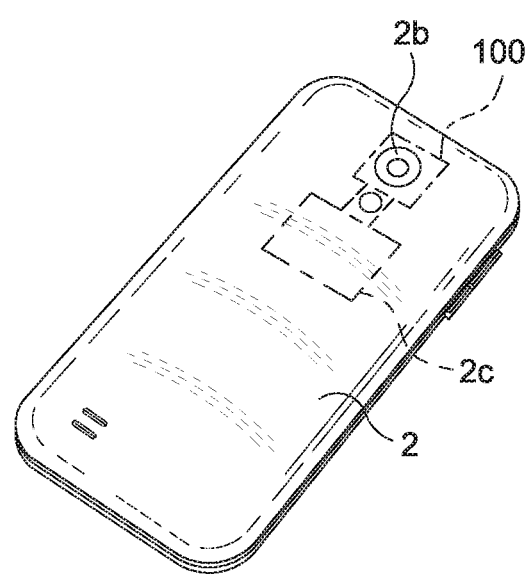
FIG. 3 is a bottom perspective view of the electronic device shown in FIG. 2.

Regardless of its particular configuration and construction, the resulting camera module may be used in a wide variety of electronic devices as is known in the art, such as in portable electronic devices (e.g., mobile phones, portable computers, tablets, watches, etc.), computers, televisions, automotive parts, etc. In one particular embodiment, the polymer composition may be employed in a camera module, such as those commonly employed in wireless communication devices (e.g., cellular telephone). Referring to FIGS. 2-3, for example, one embodiment of an electronic device 2 (e.g., phone) is shown that includes a camera module 100. As illustrated, a lens of the camera module 100 may be exposed to the outside of the electronic device 2 through an opening 2b to image an external object. The camera module 100 may also be electrically connected to an application integrated circuit 2c to perform a control operation depending on selection of a user.

The present invention may be better understood with reference to the following examples.

Test Methods

Friction and Wear:

The degree of friction generated by a sample can be characterized by the average dynamic coefficient of friction (dimensionless) as determined according to VDA 230-206:2007 using a SSP-03 machine (Stick Slip test). Likewise, the degree of wear of a sample testing may also be determined in accordance with VDA 230-206:2007. More particularly, ball-shape specimens and plate shape specimens are prepared using a polymer product via injection molding process. The ball specimen is 0.5 inches in diameter. The plate specimen is obtained from middle part of ISO tensile bar by cutting two end areas of the tensile bars. The plate specimen is fixed on sample holder, and the ball specimen is moved in contact with the plate specimens at 150 mm/s and 15 N force. After 1000 cycles, the dynamic coefficient of friction is obtained. The depth of wear is obtained from ball specimens by measuring diameter of worn-out ball area. Based on the diameter of the worn-out area, the depth of the worn-out ball specimen is calculated and obtained.

Melt Viscosity:

The melt viscosity (Pa-s) may be determined in accordance with ISO Test No. 11443:2005 at a shear rate of 400 $s^{-1}$ and temperature 15° C. above the melting temperature (e.g., about 305° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature:

The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"):

The deflection temperature under load may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation:

Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Elongation:

Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Unnotched and Notched Charpy Impact Strength:

Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Rockwell Hardness:

Rockwell hardness is a measure of the indentation resistance of a material and may be determined in accordance with ASTM D785-08 (Scale M). Testing is performed by first forcing a steel ball indentor into the surface of a material using a specified minor load. The load is then increased to a specified major load and decreased back to the original minor load. The Rockwell hardness is a measure of the net increase in depth of the indentor, and is calculated by subtracting the penetration divided by the scale division from 130.

Surface/Volume Resistivity:

The surface and volume resistivity values are generally determined in accordance with IEC 60093 (similar to ASTM D257-07). According to this procedure, a standard specimen (e.g., 1 meter cube) is placed between two electrodes. A voltage is applied for sixty (60) seconds and the resistance is measured. The surface resistivity is the quotient of the potential gradient (in V/m) and the current per unit of electrode length (in A/m), and generally represents the resistance to leakage current along the surface of an insulating material. Because the four (4) ends of the electrodes define a square, the lengths in the quotient cancel and surface resistivities are reported in ohms, although it is also common to see the more descriptive unit of ohms per square. Volume resistivity is also determined as the ratio of the potential gradient parallel to the current in a material to the current density. In SI units, volume resistivity is numerically equal to the direct-current resistance between opposite faces of a one-meter cube of the material (ohm-m).

Ball Dent Test:

To test the ability of a material to withstand a physical force, a "ball dent" test may be performed. More particularly, a sample composition may be injection molded into a specimen having a width and length of 40 mm and a thickness of 2 mm. Other thicknesses may also be tested, such as 0.2 mm. Once formed, a metal ball (1.5 mm diameter) may be dropped one time from a distance of 10 cm or 15 cm from the upper surface of the specimen. Various ball weights may be tested, such as 35 grams, 50 grams, and 75 grams. After the ball has contacted the specimen, the depth and diameter of any dent formed in the specimen is measured using an image measurement sensor from Keyence.

Mini-Drop Test:

Another technique for testing the ability of a material to withstand a physical force is a "mini-drop" test. More particularly, a sample composition may be injection molded into a specimen having a width and length of 40 mm and a thickness of 2 mm. Other thicknesses may also be tested, such as 0.2 mm. Once formed, a metal ball (1.5 mm diameter, 5 grams) may be dropped numerous times (e.g., 10,000 or 20,000 times) from a distance of 150 mm from the upper surface of the specimen. Thereafter, the depth (micrometers) of any dent formed in the specimen is measured using an image measurement sensor from Keyence.

Example 1

Samples 1-5 are formed from various percentages of a liquid crystalline polymer ("LCP"), polycyclohexylenedimethylene terephthalate ("PCT"), wollastonite fibers (Nyglos™ 4W), mica (C-4000), talc (Flextalc™ 815), an ethylene methacrylic acid copolymer (EMAC™ SP 2260), boron nitride, a first epoxy resin (Araldite™ ECN 1299, Epoxy Resin 1), a second epoxy resin (Epon™ 1009F, Epoxy Resin 2), black pigment, lubricant (Licowax™ PED 521), and various antioxidant stabilizers (AO 1010 and AO 126). The PCT polymer has an intrinsic viscosity of 062. In Sample 2, the LCP polymer ("LCP 1") is formed from 79.3 mol. % HBA, 20 mol. % HNA, and 0.7 mol. % TA (Tm=325° C.). In Sample 3, the LCP polymer ("LCP 2") is formed from 73 mol. % HBA and 27 mol. % HNA (Tm=280° C.). In Sample 4, the LCP polymer ("LCP 3") is formed from 60 mol. % HBA, 4.25 mol. % HNA, 17.875 mol. % BP, and 17.875 mol. % TA (Tm=360° C.). Finally, in Sample 5, the LCP polymer ("LCP 4") is formed from 42.86 mol,% HBA, 8.57 mol. % TA, 28.57 mol. % HQ, and 20 mol. % NDA (Tm=300° C.). Compounding was performed using an 18-mm single screw extruder. Parts are injection molded from the samples into plaques (60 mm×60 mm).

TABLE 1

| Sample | 1 | 2 | 3 | 4 | 5 |
|---|---|---|---|---|---|
| PCT | 52.32 | 20.32 | 20.32 | 20.32 | 20.32 |
| LCP 1 | — | 41 | — | — | — |
| LCP 2 | — | — | 41 | — | — |
| LCP 3 | — | — | — | 41 | — |
| LCP 4 | — | — | — | — | 41 |
| Wollastonite Fibers | 15 | 15 | 15 | 15 | 15 |
| Mica | 20 | 20 | 20 | 20 | 20 |
| Talc | 2.5 | 0.625 | 0.625 | 0.625 | 0.625 |
| Ethylene Methacrylic Acid Polymer | 6 | 1.5 | 1.5 | 1.5 | 1.5 |
| Boron Nitride | 0.15 | 0.15 | 0.15 | 0.15 | 0.15 |
| Epoxy Resin 1 | 0.6 | 0.15 | 0.15 | 0.15 | 0.15 |
| Epoxy Resin 2 | 1.5 | 0.375 | 0.375 | 0.375 | 0.375 |
| Black Pigment | 0.53 | 0.53 | 0.53 | 0.53 | 0.53 |
| Lubricant | 0.6 | 0.15 | 0.15 | 0.15 | 0.15 |
| Antioxidants | 0.8 | 0.2 | 0.2 | 0.2 | 0.2 |

Samples 1-5 were tested for thermal and mechanical properties. The results are set forth below in Table 2.

TABLE 2

| Sample | 1 | 2 | 3 | 4 | 5 |
|---|---|---|---|---|---|
| Charpy Unnotched (kJ/m$^2$) | 20 | 3.7 | 12 | 2.3 | 3.2 |
| Rockwell Surface Hardness (M-scale) | 73 | 54 | 72 | 28 | 39 |
| Tensile Strength (MPa) | 58 | 42 | 86 | 26 | 27 |
| Tensile Modulus (MPa) | 7,702 | 11,923 | 11,684 | 9,329 | 9,299 |
| Tensile Elongation (%) | 0.92 | 0.37 | 1.05 | 0.28 | 0.29 |
| Flexural Strength (MPa) | 106 | 97 | 139 | 60 | 62 |
| Flexural Modulus (MPa) | 7,399 | 13,583 | 13,140 | 10,619 | 10,551 |
| Flexural Elongation (%) | 1.93 | 0.89 | 1.64 | 0.62 | 0.66 |
| Melt Viscosity (Pa-s) at 400 s$^{-1}$ | 111.7 | 182.3 | 129.0 | 493.4 | 435.8 |
| Melting Temperature (° C., 1$^{st}$ heat of DSC) | 288.45 | 286.84 | 287.8 | 288.14 | 288.04 |

Example 2

Samples 6-9 are formed from various percentages of LCP 2 as referenced above, polycyclohexylenedimethylene terephthalate ("PCT"), wollastonite fibers (Nyglos™ 4W), mica (C-4000), talc (Flextalc™ 815), an ethylene methacrylic acid copolymer (EMAC™ SP 2260), boron nitride, a first epoxy resin (Araldite™ ECN 1299, Epoxy Resin 1), a second epoxy resin (Epon™ 1009F, Epoxy Resin 2), black pigment, lubricant (Licowax™ PED 521), an ionic liquid (FC-4400), and various antioxidant stabilizers (AO 1010 and AO 126). The PCT polymer has an intrinsic viscosity of 0.62. Compounding was performed using an 18-mm single screw extruder. Parts are injection molded from the samples into plaques (60 mm×60 mm).

TABLE 3

| Sample | 6 | 7 | 8 | 9 |
|---|---|---|---|---|
| PCT | 21.52 | 12.261 | 8.1674 | 5.6085 |
| LCP 2 | 44 | 55 | 60 | 63 |
| Wollastonite Fibers | 30 | 30 | 30 | 30 |
| Mica | 20 | 20 | 20 | 20 |
| Talc | 0.625 | 0.312 | 0.1563 | 0.0782 |
| Ethylene Methacrylic Acid Polymer | 1.5 | 0.75 | 0.375 | 0.1875 |
| Boron Nitride | 0.15 | 0.15 | 0.15 | 0.15 |
| Epoxy Resin 1 | 0.15 | 0.1 | 0.0375 | 0.0188 |
| Epoxy Resin 2 | 0.375 | 0.1875 | 0.0938 | 0.0469 |
| Ionic Liquid | 0.8 | 0.8 | 0.8 | 0.8 |
| Black Pigment | 0.53 | 0.265 | 0.1325 | 0.0663 |
| Lubricant | 0.15 | 0.075 | 0.0375 | 0.0188 |
| Antioxidants | 0.2 | 0.1 | 0.05 | 0.025 |

Samples 7-8 were tested for mechanical properties. The results are set forth below in Table 4.

TABLE 4

| Sample | 6 | 7 | 8 | 9 |
|---|---|---|---|---|
| Melt Viscosity (Pa-s) at 400 s$^{-1}$ | 102.6 | 97.6 | 101.6 | 106.7 |
| Melting Temperature (° C., 1$^{st}$ heat of DSC) | 287.2 | 285.9 | 285.6 | 280.1 |
| Charpy Unnotched (kJ/m$^2$) | 28 | 44 | 46 | 53 |
| Rockwell Surface Hardness (M-scale) | 75 | 73 | 75 | 75 |
| Tensile Strength (MPa) | 120 | 147 | 160 | 182 |
| Tensile Modulus (MPa) | 12,274 | 14,171 | 14,598 | 15,135 |
| Tensile Elongation (%) | 2.0 | 3.2 | 3.7 | 4.2 |
| Flexural Strength (MPa) | 171 | 194 | 202 | 208 |
| Flexural Modulus (MPa) | 12,836 | 14,266 | 14,762 | 15,069 |
| Flexural Elongation (%) | — | 3.1 | 3.4 | — |
| Ball Dents (35 g) (depth, μm) | 8 | 6 | 9 | — |
| Ball Dents (50 g) (depth, μm) | 20 | 15 | 16 | — |
| Ball Dents (75 g) (depth, μm) | 42 | 38 | 32 | — |
| Surface Resistivity (ohm) | | 6.7 × 10$^{11}$ | 4.6 × 10$^{11}$ | |
| Volume Resistivity (ohm-m) | | 7.4 × 10$^{12}$ | 5.2 × 10$^{11}$ | |

Example 3

Samples 10-13 are formed from various percentages of a liquid crystalline polymer (LCP 1, LCP 2, LCP 3, or LCP 4 as referenced above), polycyclohexylenedimethylene terephthalate ("PCT"), wollastonite fibers (Nyglos™ 4W), mica (C-4000), talc (Flextalc™ 815), an ethylene methacrylic acid copolymer (EMAC™ SP 2260), boron nitride, a first epoxy resin (Araldite™ ECN 1299, Epoxy Resin 1), a second epoxy resin (Epon™ 1009F, Epoxy Resin 2), black pigment, lubricant (Licowax™ PED 521), and various antioxidant stabilizers (AO 1010 and AO 126). The PCT polymer has an intrinsic viscosity of 0.62. Compounding was performed using an 18-mm single screw extruder. Parts are injection molded from the samples into plaques (60 mm×60 mm).

TABLE 5

| Sample | 10 | 11 | 12 | 13 |
|---|---|---|---|---|
| PCT | 33.32 | 33.32 | 33.32 | 33.32 |
| LCP 1 | 19 | — | — | — |
| LCP 2 | — | 19 | — | — |
| LCP 3 | — | — | 19 | — |
| LCP 4 | — | — | — | 19 |
| Wollastonite Fibers | 15 | 15 | 15 | 15 |
| Mica | 20 | 20 | 20 | 20 |
| Talc | 2.5 | 2.5 | 2.5 | 2.5 |
| Ethylene Methacrylic Acid Polymer | 6 | 6 | 6 | 6 |
| Boron Nitride | 0.15 | 0.15 | 0.15 | 0.15 |
| Epoxy Resin 1 | 0.6 | 0.6 | 0.6 | 0.6 |
| Epoxy Resin 2 | 1.5 | 1.5 | 1.5 | 1.5 |
| Black Pigment | 0.53 | 0.53 | 0.53 | 0.53 |
| Lubricant | 0.6 | 0.6 | 0.6 | 0.6 |
| Antioxidants | 0.8 | 0.8 | 0.8 | 0.8 |

Samples 10-13 were tested for thermal and mechanical properties. The results are set forth below in Table 6.

TABLE 6

| Sample | 10 | 11 | 12 | 13 |
|---|---|---|---|---|
| Charpy Unnotched (kJ/m$^2$) | 7.5 | 9.6 | 8.6 | 6.9 |
| Rockwell Surface Hardness (M-scale) | 56 | 61 | 52 | 57 |
| Tensile Strength (MPa) | 52 | 62 | 41 | 40 |
| Tensile Modulus (MPa) | 8,478 | 8,620 | 7,522 | 7,547 |
| Tensile Elongation (%) | 0.74 | 1 | 0.62 | 0.61 |
| Flexural Strength (MPa) | 84 | 107 | 73 | 66 |
| Flexural Modulus (MPa) | 8,780 | 9,008 | 7,539 | 7,397 |
| Flexural Elongation (%) | 1.22 | 1.7 | 1.21 | 1.06 |
| Melt Viscosity (Pa-s) at 400 s$^{-1}$ | 142.1 | 110.7 | 241.0 | 230.6 |
| Melting Temperature (° C., 1$^{st}$ heat of DSC) | 287 | 288 | 288 | 289 |

Example 4

Samples 14-16 are formed from various percentages of liquid crystalline polymers (LCP 1 and LCP 2 as referenced above), wollastonite fibers (Nyglos™ 4W), mica, an ethylene/n-butyl acrylate/glycidyl methacrylate terpolymer (Elvaloy™ PTW), an ultrahigh molecular weight siloxane polymer (Genioplast® Pellet S), polyethylene, and/or an ionic liquid (FC-4400). Parts are injection molded from the samples into plaques (60 mm×60 mm).

TABLE 7

| Sample | 14 | 15 | 16 |
|---|---|---|---|
| LCP 1 | 51.9 | 53.9 | 55.9 |
| LCP 2 | 12.5 | 12.5 | 12.5 |
| Wollastonite Fibers | 30 | 30 | 30 |
| Mica | 2 | — | — |
| Ethylene Terpolymer | 1 | 1 | 1 |
| Siloxane Polymer | 2 | 2 | — |
| Polyethylene | — | 2 | — |
| Ionic Liquid | 0.6 | 0.6 | 0.6 |

Samples 14-16 were tested for mechanical properties. The results are set forth below in Table 8.

TABLE 8

| Sample | 14 | 15 | 16 |
|---|---|---|---|
| Melt Viscosity (Pa-s) at 400 s$^{-1}$ | 87.2 | 90.8 | 75.9 |
| Melting Temperature (° C., 1$^{st}$ heat of DSC) | — | — | — |
| DTUL at 1.8 MPa (° C.) | 211 | 206 | 214 |
| Charpy Notched (kJ/m$^2$) | 5.2 | 4.4 | 13 |
| Charpy Unnotched (kJ/m$^2$) | 14 | — | 42 |
| Rockwell Surface Hardness (M-scale) | 60 | 49 | 66 |
| Tensile Strength (MPa) | 123 | 116 | 168 |
| Tensile Modulus (MPa) | 12,535 | 11,518 | 13,880 |
| Tensile Elongation (%) | 2.0 | 2.1 | 3.6 |
| Flexural Strength (MPa) | 164 | 152 | 196 |
| Flexural Modulus (MPa) | 13,110 | 12,134 | 14,217 |
| Flexural Elongation (%) | 2.6 | 2.5 | 3.4 |
| Ball Dents (35 g) (depth, μm) | — | — | 5 |
| Ball Dents (50 g) (depth, μm) | — | — | 12 |
| Ball Dents (75 g) (depth, μm) | — | — | 25 |

Example 5

Samples 17-20 are formed from various percentages of liquid crystalline polymers (LCP 1 and LCP 2 as referenced above), wollastonite fibers (Nyglos™ 4W), barium sulfate, an ethylene/n-butyl acrylate/glycidyl methacrylate terpolymer (Elvaloy™ PTW), and/or an ionic liquid (FC-4400), Parts are injection molded from the samples into plaques (60 mm×60 mm).

TABLE 9

| Sample | 17 | 18 | 19 | 20 |
|---|---|---|---|---|
| LCP 1 | 55.9 | 50.9 | 50.9 | 50.9 |
| LCP 2 | 12.5 | 12.5 | 12.5 | 12.5 |
| Wollastonite Fibers | 30 | 20 | 10 | — |
| Ethylene Terpolymer | 1 | 1 | 1 | 1 |
| Barium Sulfate | — | 15 | 25 | 35 |
| Ionic Liquid | 0.6 | 0.6 | 0.6 | 0.6 |

Samples 17-20 were tested for mechanical properties. The results are set forth below in Table 10.

TABLE 10

| Sample | 17 | 18 | 19 | 20 |
|---|---|---|---|---|
| Melt Viscosity (Pa-s) at 400 s$^{-1}$ | 74 | 70 | 66 | 65 |
| Melting Temperature (° C., 1$^{st}$ heat of DSC) | 319 | 316 | 314 | 314 |
| DTUL at 1.8 MPa (° C.) | 207 | 202 | 190 | 185 |
| Charpy Notched (kJ/m$^2$) | 10 | 12 | 13 | 15 |
| Charpy Unnotched (kJ/m$^2$) | 38 | 37 | 47 | 45 |
| Rockwell Surface Hardness (M-scale) | 66 | 66 | 65 | 61 |
| Tensile Strength (MPa) | 154 | 143 | 141 | 137 |
| Tensile Modulus (MPa) | 12,368 | 11,400 | 9,923 | 8,117 |
| Tensile Elongation (%) | 3.7 | 4.0 | 4.4 | 4.6 |
| Flexural Strength (MPa) | 178 | 168 | 156 | 135 |
| Flexural Modulus (MPa) | 12,792 | 11,543 | 10,064 | 8,551 |
| Flexural Elongation (%) | >3.5 | >3.5 | >3.5 | >3.5 |
| Ball Dents (35 g) (depth, μm) | — | — | 6 | 6 |
| Ball Dents (50 g) (depth, μm) | — | — | 15 | 11 |
| Ball Dents (75 g) (depth, μm) | — | — | 26 | 26 |

Example 6

Samples 21-22 are formed from various percentages of a liquid crystalline polymers ("LCP 1" and/or "LCP 2" as referenced above), wollastonite fibers (Nyglos™ 4W), anhydrous calcium sulfate, ionic liquid (FC-4400), and black pigment. Parts are injection molded from the samples into plaques (60 mm×60 mm).

TABLE 11

| Sample | 21 | 22 |
|---|---|---|
| LCP 1 | — | 56.9 |
| LCP 2 | 66.9 | 10.0 |
| Black Pigment | 2.5 | 2.5 |
| Wollastonite Fibers | 10 | 10 |
| Calcium Sulfate | 20 | 20 |
| Ionic Liquid | 0.6 | 0.6 |

Samples 21-22 were tested for mechanical properties. The results are set forth below in Table 12.

TABLE 12

| Sample | 21 | 22 |
|---|---|---|
| Melt Viscosity (Pa-s) at 400 s$^{-1}$ | 574 | 71 |
| DTUL at 1.8 MPa (° C.) | 191 | 200 |
| Charpy Notched (kJ/m$^2$) | 15.5 | 4.3 |
| Charpy Unnotched (kJ/m$^2$) | 49.5 | 38.3 |
| Rockwell Surface Hardness (M-scale) | 70 | 70 |
| Tensile Strength (MPa) | 151 | 134 |
| Tensile Modulus (MPa) | 11,008 | 10,379 |
| Tensile Elongation (%) | 5.2 | 3.9 |
| Flexural Strength (MPa) | 165 | 165 |
| Flexural Modulus (MPa) | 11,206 | 11,058 |
| Flexural Elongation (%) | — | — |
| Ball Dents (35 g) (depth, μm) | 4.8 | 4 |

Example 7

Samples 23-26 are formed from various percentages of a liquid crystalline polymers ("LCP 1" and/or "LCP 2" as referenced above), wollastonite fibers (Nyglos™ 4W), amorphous silica (median particle size of 1.7 μm), a terpolymer of ethylene, acrylic ester and glycidyl methacrylate (Lotader™ AX8900), an ultrahigh molecular weight siloxane polymer (Genioplast® Pellet S), polytetrafluoroethylene ("PTFE"), calcium sulfate, and mica. Parts are injection molded from the samples into plaques (60 mm×60 mm).

TABLE 13

| Sample | 23 | 24 | 25 | 26 |
|---|---|---|---|---|
| LCP 1 | 57.5 | 54.5 | 54.5 | 54.5 |
| LCP 2 | 12.5 | 12.5 | 12.5 | 12.5 |
| Ethylene Terpolymer | — | — | — | 1 |
| Siloxane Polymer | — | — | — | 2 |
| Mica | — | — | — | 2 |
| Wollastonite Fibers | 10 | 10 | 10 | 10 |
| Calcium Sulfate | — | — | 20 | 20 |
| PTFE | — | 3 | 3 | 3 |
| Amorphous Silica | 20 | 20 | — | — |

Samples 23-26 were tested for mechanical properties. The results are set forth below in Table 14.

TABLE 14

| Sample | 23 | 24 | 25 | 26 |
|---|---|---|---|---|
| Melt Viscosity (Pa-s) at 400 s$^{-1}$) | 42 | 51 | 63 | 55 |
| DTUL at 1.8 MPa (° C.) | — | — | 196 | 193 |
| Charpy Unnotched (kJ/m$^2$) | 41 | 44 | 25 | 11 |
| Rockwell Surface Hardness (M-scale) | 67 | 66 | 66 | 56 |
| Tensile Strength (MPa) | 142 | 155 | 155 | 134 |
| Tensile Modulus (MPa) | 10,300 | 11,037 | 11,106 | 9,564 |
| Tensile Elongation (%) | 5.24 | 4.56 | 3.61 | 4.82 |
| Flexural Strength (MPa) | 163 | 165 | 168 | 150 |
| Flexural Modulus (MPa) | 10,320 | 10,762 | 10,902 | 9,793 |
| Avg. Ball Dents (5 g, 150 mm, 10,000 times) (depth, μm) | 3.9 | — | — | — |
| Avg. Ball Dents (5 g, 150 mm, 20,000 times) (depth, μm) | 4.0 | — | — | — |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A camera module comprising:
a housing within which a lens module containing a lens barrel is positioned that contains one or more lenses;
an actuator assembly that is configured to drive the lens module in an optical axis direction, wherein the actuator assembly includes a guide unit that is positioned between the housing and the lens module, wherein the guide unit comprises a polymer composition that includes a polymer matrix containing an aromatic polymer, wherein the polymer composition exhibits a flexural modulus of about 7,000 MPa or more as determined in accordance with ISO Test No. 178:2010 at 23° C. and a Rockwell surface hardness of about 25 or more as determined in accordance with ASTM D785-08 (Scale M), and wherein the polymer composition comprises one or more mineral fillers including silica particles.

2. The camera module of claim 1, wherein the polymer composition exhibits a Charpy unnotched impact strength of about 2 kJ/m$^2$ as determined at 23° C. according to ISO Test No. 179-1:2010.

3. The camera module of claim 1, wherein the polymer composition exhibits a tensile strength of from about 20 to about 500 MPa, a tensile break strain of about 0.5% or more, and/or a tensile modulus of from about 5,000 MPa to about 30,000 MPa, as determined in accordance with ISO Test No. 527:2012.

4. The camera module of claim 1, wherein the polymer composition exhibits a dynamic coefficient of friction of about 1.0 or less and/or a wear depth of about 500 micrometers or less, as determined in accordance with VDA 230-206:2007.

5. The camera module of claim 1, wherein the polymer matrix constitutes from about 20 wt. % to about 70 wt. % of the polymer composition.

6. The camera module of claim 1, wherein the aromatic polymer has a melting temperature of about 200° C. or more.

7. The camera module of claim 1, wherein the aromatic polymer is a polyamide, polyester, polyarylene sulfide, polycarbonate, polyphenylene oxide, polyetherimide, liquid crystalline polymer, or a combination thereof.

8. The camera module of claim 1, wherein the aromatic polymer comprises a liquid crystalline polymer.

9. The camera module of claim 8, wherein the liquid crystalline polymer contains one or more repeating units derived from a hydroxycarboxylic acid, wherein the hydroxycarboxylic acid repeating units constitute about 50 mol. % or more of the polymer.

10. The camera module of claim 9, wherein the liquid crystalline polymer contains repeating units derived from 4-hydroxybenzoic acid, 6-hydroxy-2-naphtoic acid, or a combination thereof.

11. The camera module of claim 10, wherein the liquid crystalline polymer contains repeating units derived from 4-hydroxybenzoic acid in an amount of from about 50 mol. % to about 90 mol. % of the polymer and contains repeating units derived from 6-hydroxy-2-naphtoic acid in amount of from about 10 mol. % to about 50 mol. % of the polymer.

12. The camera module of claim 10, wherein the liquid crystalline polymer further contains repeating units derived from terephthalic acid, isophthalic acid, 2,6-naphthalenedicarboxylic acid, hydroquinone, 4,4'-biphenol, acetaminophen, 4-aminophenol, or a combination thereof.

13. The camera module of claim 8, wherein the liquid crystalline polymer contains repeating units derived from naphthenic hydroxycarboxylic and/or dicarboxylic acids in an amount of about 10 mol. % or more of the polymer.

14. The camera module of claim 8, wherein the polymer composition further comprises a semi-crystalline polyester that includes poly(ethylene terephthalate), poly(1,4-butylene terephthalate), poly(1,3-propylene terephthalate), poly (1,4-butylene 2,6-naphthalate), poly(ethylene 2,6-naphthalate), poly(1,4-cyclohexylenedimethylene terephthalate), a derivative of any of the foregoing, or a combination thereof.

15. The camera module of claim 14, wherein liquid crystalline polymers constitute from about 15 wt. % to about 85 wt. % of the polymer composition and semi-crystalline polyesters constitute from about 1 wt. % to about 50 wt. % of the polymer composition.

16. The camera module of claim 1, wherein the polymer composition contains one or more mineral fillers in addition to the silica particles.

17. The camera module of claim 16, wherein the one or more additional mineral fillers have a hardness value of about 2.0 or more based on the Mohs hardness scale.

18. The camera module of claim 16, wherein the polymer composition is generally free of glass fibers.

19. The camera module of claim 1, wherein the mineral fillers constitute from about 20 to about 100 parts by weight per 100 parts by weight of the polymer matrix.

20. The camera module of claim 1, wherein the mineral fillers contain mineral fibers.

21. The camera module of claim 20, wherein the mineral fibers include wollastonite fibers.

22. The camera module of claim 20, wherein mineral fibers constitute about 1 wt. % to about 40 wt. % of the polymer composition and mineral particles constitute from about 2 wt. % to about 50 wt. % of the polymer composition.

23. The camera module of claim 1, wherein the polymer composition further comprises mineral particles including barium sulfate, calcium sulfate, mica, or a combination thereof.

24. The camera module of claim 1, wherein the polymer composition contains an impact modifier.

25. The camera module of claim 24, wherein the impact modifier includes an olefin polymer.

26. The camera module of claim 25, wherein the olefin polymer is a copolymer that contains a (meth)acrylic monomeric unit.

27. The camera module of claim 1, wherein the polymer composition contains an epoxy resin.

28. The camera module of claim 1, wherein the polymer composition contains an antistatic filler.

29. The camera module of claim 1, wherein the polymer composition contains a tribological formulation, lubricant, thermally conductive filler, pigment, antioxidant, stabilizer, surfactant, wax, flame retardant, anti-drip additive, nucleating agent, or a combination thereof.

30. The camera module of claim 1, wherein the polymer composition exhibits a melt viscosity of from about 30 to about 400 Pa-s, as determined at a shear rate of 400 seconds$^{-1}$ and at a temperature 15° C. higher than the melting temperature of the composition in accordance with ISO Test No. 11443:2005.

31. The camera module of claim 1, wherein the actuator assembly includes a magnetic body and coil configured to move the lens module in the optical axis direction.

32. The camera module of claim 31, wherein the coil is mounted on a substrate, and wherein the substrate is mounted to the housing.

33. The camera module of claim 1, wherein the guide unit includes a spring, ball bearing, electrostatic force generator, hydraulic force generator, or a combination thereof.

34. The camera module of claim 1, wherein the guide unit includes multiple ball bearings.

35. The camera module of claim 34, wherein the lens barrel is coupled to a lens holder, and further wherein the ball bearings contact an outer surface of the lens holder and an inner surface of the housing.

36. The camera module of claim 34, wherein the ball bearings are stacked in a direction perpendicular to the optical axis direction.

37. The camera module of claim 34, wherein the ball bearings have an average size of about 800 micrometers or less.

38. The camera module of claim 1, wherein polymer composition exhibits a dent of about 50 micrometers or less when contacted with a metal ball having a diameter of 1.5 mm and weight of 75 grams that is dropped from a height of 15 centimeters into contact with the polymer composition.

39. The camera module of claim 1, wherein polymer composition exhibits a dent of about 50 micrometers or less when contacted 10,000 times with a metal ball having a diameter of 1.5 mm and weight of 5 grams, which is dropped from a height of 150 millimeters into contact with the polymer composition.

40. An electronic device comprising the camera module of claim 1.

41. The electronic device of claim 40, wherein the device is a wireless communication device.

* * * * *